US012712679B2

(12) United States Patent
Park et al.

(10) Patent No.: US 12,712,679 B2
(45) Date of Patent: Aug. 18, 2026

(54) METHOD AND APPARATUS FOR PERFORMING SL DRX OPERATION IN NR V2X

(71) Applicant: LG ELECTRONICS INC., Seoul (KR)

(72) Inventors: Giwon Park, Seoul (KR); Seungmin Lee, Seoul (KR); Seoyoung Back, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 299 days.

(21) Appl. No.: 18/569,395

(22) PCT Filed: Jun. 16, 2022

(86) PCT No.: PCT/KR2022/008522

§ 371 (c)(1),
(2) Date: Dec. 12, 2023

(87) PCT Pub. No.: WO2022/265421

PCT Pub. Date: Dec. 22, 2022

(65) Prior Publication Data

US 2024/0275528 A1 Aug. 15, 2024

(30) Foreign Application Priority Data

Jun. 16, 2021 (KR) ........................ 10-2021-0077869
Jun. 17, 2021 (KR) ........................ 10-2021-0078611

(51) Int. Cl.
*H04L 1/1867* (2023.01)
*H04L 1/1829* (2023.01)
(Continued)

(52) U.S. Cl.
CPC .......... *H04L 1/1883* (2013.01); *H04L 1/1864* (2013.01); *H04W 76/28* (2018.02); *H04W 92/18* (2013.01)

(58) Field of Classification Search
CPC ... H04L 1/1883; H04L 1/1864; H04L 1/1851; H04L 1/1861; H04L 1/1896;
(Continued)

(56) References Cited

U.S. PATENT DOCUMENTS

2020/0344722 A1 10/2020 He et al.
2021/0037468 A1 2/2021 Huang et al.
(Continued)

FOREIGN PATENT DOCUMENTS

EP 4207918 7/2023
KR 10-2021-0030872 3/2021
WO 2021-075877 4/2021

OTHER PUBLICATIONS

PCT International Application No. PCT/KR2022/008522, International Search Report dated Sep. 19, 2022, 3 pages.
(Continued)

*Primary Examiner* — Candal Elpenord
(74) *Attorney, Agent, or Firm* — LEE, HONG, DEGERMAN, KANG & WAIMEY

(57) ABSTRACT

Proposed are a method by which a first device performs wireless communication, and an apparatus supporting same. The method may comprise the steps of: acquiring an SL DRX configuration including an SL DRX inactivity timer, an SL DRX HARQ RTT timer, and an SL DRX retransmission timer, receiving, from a second device through a first PSCCH, first SCI for scheduling of a first PSSCH and second SCI; and receiving the second SCI and a first MAC PDU from the second device through the first PSSCH. For example, the first device may start the SL DRX inactivity timer. For example, the first device may transmit SL HARQ feedback information to the second device through a PSFCH on a PSFCH resource determined on the basis of a slot index and a sub-channel index related to the first PSSCH. For example, the first device may restart the SL DRX inactivity timer after the PSFCH resource on the basis of the second SCI being related to a groupcast.

20 Claims, 17 Drawing Sheets

(51) Int. Cl.
*H04W 76/28* (2018.01)
*H04W 92/18* (2009.01)

(58) Field of Classification Search
CPC .......... H04L 2001/0093; H04W 76/28; H04W 92/18; H04W 4/08; H04W 4/40; H04W 72/25
USPC .................................................. 370/329–330
See application file for complete search history.

(56) References Cited

U.S. PATENT DOCUMENTS

2021/0075552 A1* 3/2021 Huang .................. H04L 1/1854
2021/0306824 A1* 9/2021 Li .......................... H04W 72/02
2022/0346180 A1* 10/2022 Tseng .................... H04W 76/14
2022/0353815 A1* 11/2022 Lin ................... H04W 52/0232
2022/0353945 A1* 11/2022 Liu ....................... H04W 76/28
2023/0019726 A1* 1/2023 Kwon ..................... H04W 4/40
2023/0300857 A1* 9/2023 Deng .................... H04W 72/11 370/329
2023/0300905 A1 9/2023 Park et al.
2023/0319951 A1* 10/2023 Cai ....................... H04W 72/40 370/252
2024/0172325 A1* 5/2024 Adjakple .............. H04W 88/02

OTHER PUBLICATIONS

OPPO, "Discussion on DRX configuration and DRX timers," R2-2104835, 3GPP TSG-RAN WG2 #114-e, E-meeting, May 2021, 19 pages.

Mediatek Inc., "On SL DRX model," R2-2103576, 3GPP TSG-RAN WG2 Meeting #113 bis electronic, Online, Apr. 2021, 14 pages.

CATT, "DRX Design for Sidelink Groupcast and Broadcast," R2-2104751, 3GPP TSG-RAN WG2 Meeting #114, Electronic, May 2021, 8 pages.

European Patent Office Application Serial No. 22825344.9, Search Report dated May 22, 2025, 12 pages.

* cited by examiner

FIG. 2

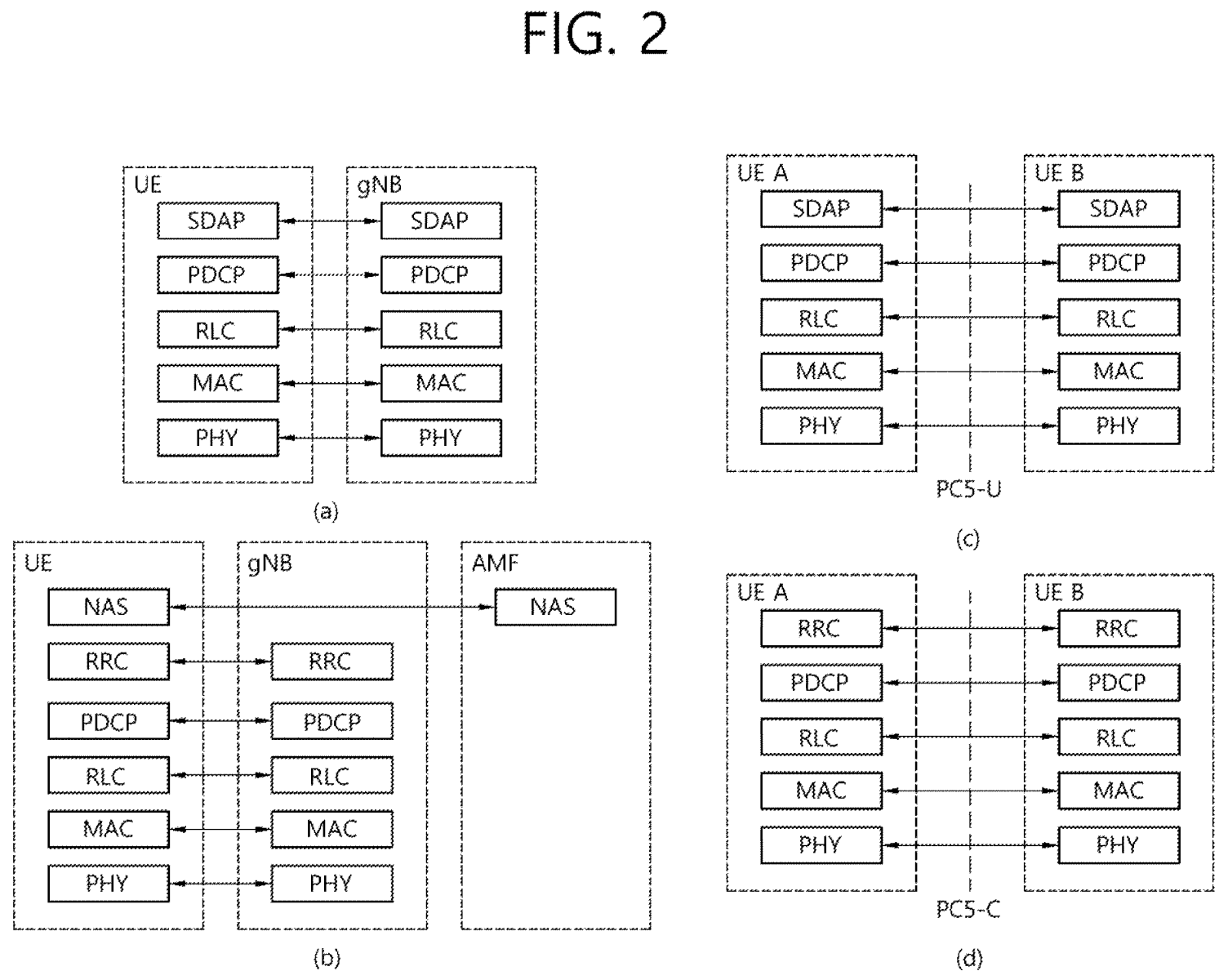

UE
SDAP
PDCP
RLC
MAC
PHY gNB
SDAP
PDCP
RLC
MAC
PHY (a)

UE
NAS
RRC
PDCP
RLC
MAC
PHY gNB
RRC
PDCP
RLC
MAC
PHY

AMF
NAS (b)

UE A
SDAP
PDCP
RLC
MAC
PHY

UE B
SDAP
PDCP
RLC
MAC
PHY

PC5-U (c)

UE A
RRC
PDCP
RLC
MAC
PHY

UE B
RRC
PDCP
RLC
MAC
PHY

PC5-C (d)

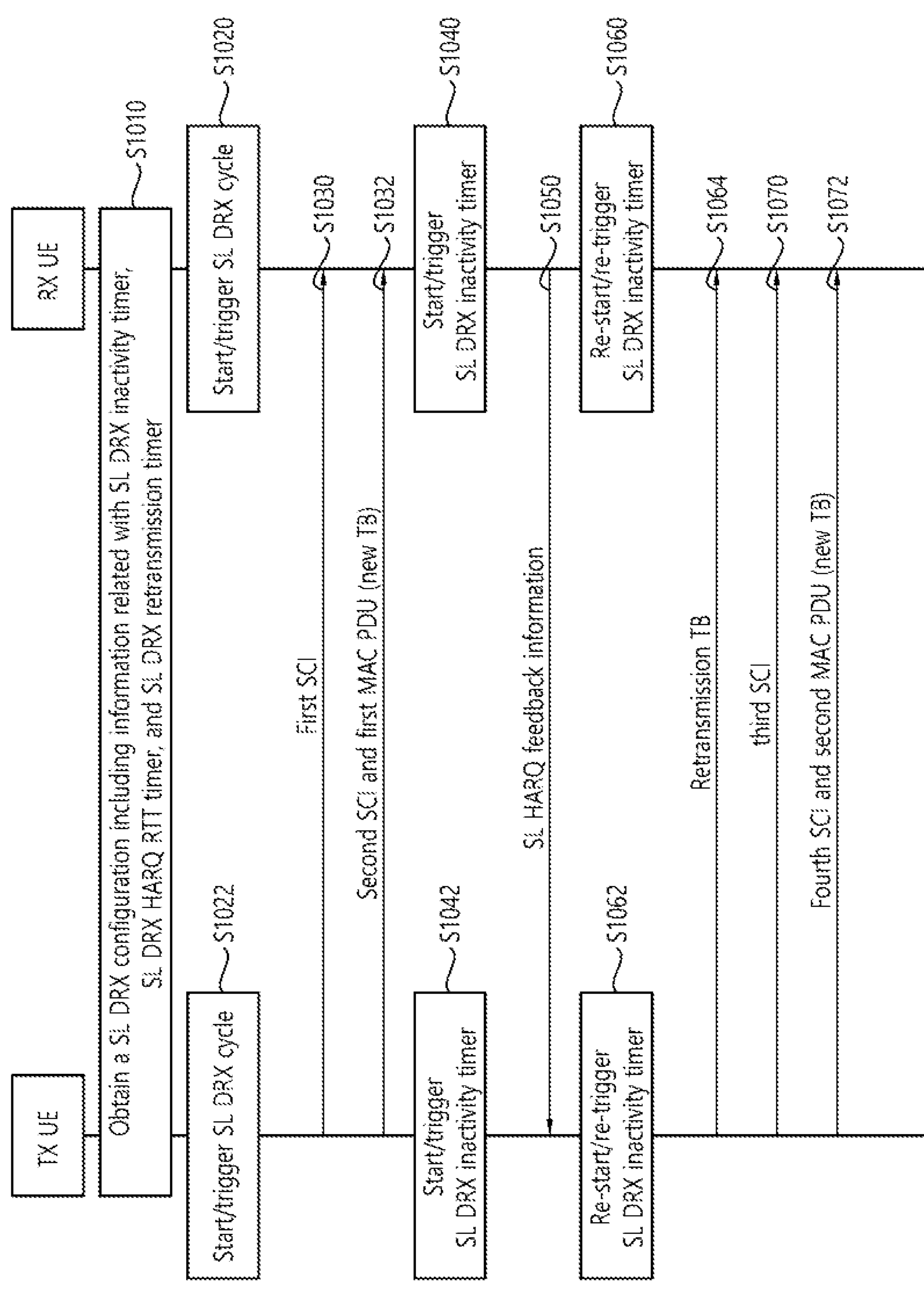
FIG. 10
TX UE
RX UE
Obtain a SL DRX configuration including information related with SL DRX inactivity timer, SL DRX HARQ RTT timer, and SL DRX retransmission timer
S1010
Start/trigger SL DRX cycle
S1022
Start/trigger SL DRX cycle
S1020
First SCI
S1030
Second SCI and first MAC PDU (new TB)
S1032
Start/trigger SL DRX inactivity timer
S1042
Start/trigger SL DRX inactivity timer
S1040
SL HARQ feedback information
S1050
Re-start/re-trigger SL DRX inactivity timer
S1062
Re-start/re-trigger SL DRX inactivity timer
S1060
Retransmission TB
S1064
third SCI
S1070
Fourth SCI and second MAC PDU (new TB)
S1072

Figure 19:
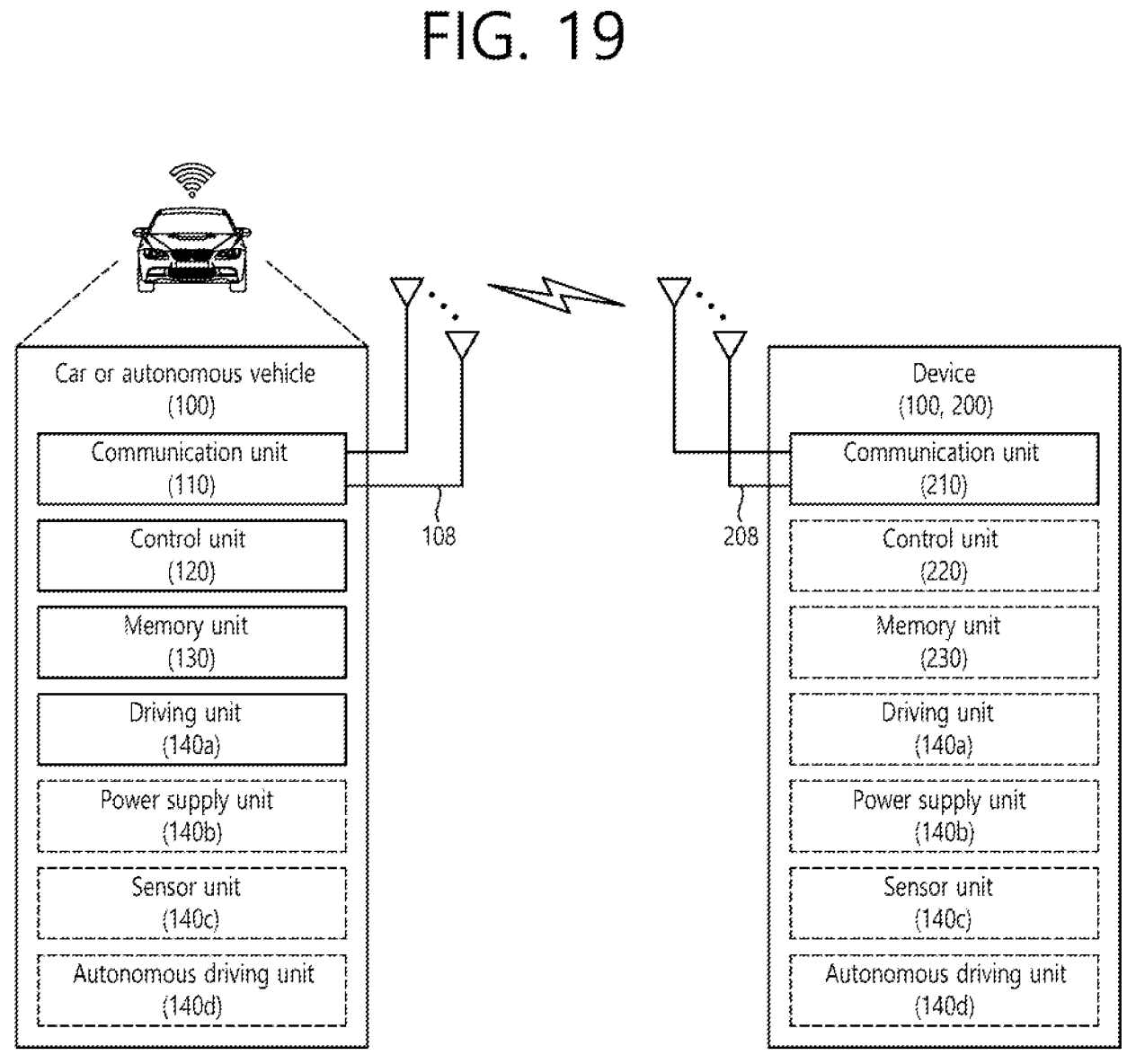

Car or autonomous vehicle (100)
Communication unit (110)
Control unit (120)
Memory unit (130)
Driving unit (140a)
Power supply unit (140b)
Sensor unit (140c)
Autonomous driving unit (140d)
108

Device (100, 200)
Communication unit (210)
Control unit (220)
Memory unit (230)
Driving unit (140a)
Power supply unit (140b)
Sensor unit (140c)
Autonomous driving unit (140d)
208

METHOD AND APPARATUS FOR PERFORMING SL DRX OPERATION IN NR V2X

CROSS-REFERENCE TO RELATED APPLICATIONS

This application is the National Stage filing under 35 U.S.C. 371 of International Application No. PCT/KR2022/008522, filed on Jun. 16, 2022, which claims the benefit of earlier filing date and right of priority to Korean Application Nos. 10-2021-0077869, filed on Jun. 16, 2021, and 10-2021-0078611, filed on Jun. 17, 2021, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

For example, in case of groupcast-type SL transmission, a transmission (TX) UE may perform SL communication with respect to one or more reception (RX) UEs (e.g., target RX UEs) in a group to which the TX UE belongs. After the RX UE receives a PSCCH targeting at the RX UE, when the target RX UE fails in decoding of a transport block related to the PSCCH, the RX UE may transmit HARQ-NACK to the TX UE through a PSFCH. For example, in case of a groupcast option 1, when the RX UE decodes the PSCCH targeting at the RX UE and successfully decodes the transport block related to the PSCCH, the RX UE may not transmit HARQ-ACK to the TX UE. For example, in case of a groupcast option 2, when the RX UE decodes the PSCCH targeting at the RX UE and the RX UE successfully decodes the transport block related to the PSCCH, the RX UE may transmit the HARQ-ACK through the PSFCH.

Meanwhile, the TX UE and the RX UE may perform an SL DRX operation based on an SL DRX configuration in sidelink groupcast. In this case, for example, it may not be guaranteed that all RX UEs belonging to the group successfully receive the transport block related to the PSCCH transmitted by the TX UE. For example, in case of the groupcast options 1 and 2, when the TX UE transmits the transport block to all RX UEs belonging to the group by considering only an active time of the TX UE, some RX UEs belonging to the group may not be able to receive the transport block within a time during which the active time of the TX UE and the active time of the RX UEs overlap. For example, some RX UEs belonging to the group may not be able to receive the transport block transmitted by the TX UE within the active time of the TX UE irrespective of a decoding success/failure due to discontinuous transmission (DTX) or the like.

In an embodiment, a method by which a first device performs wireless communication is provided. The first device may obtain a sidelink (SL) discontinuous reception (DRX) configuration including an SL DRX inactivity timer, an SL DRX hybrid automatic repeat request (HARQ) round-trip time (RTT) timer, and an SL DRX retransmission timer. For example, the first device may receive first sidelink control information (SCI) for scheduling of a first physical sidelink shard channel (PSSCH) and second SCI from a second device through a first physical sidelink control channel (PSCCH). For example, the first device may receive the second SCI and a first medium access control (MAC) protocol data unit (PDU) from the second device through the first PSSCH. For example, the first device may start the SL DRX inactivity timer. For example, the first device may transmit SL HARQ feedback information to the second device through a physical sidelink feedback channel (PSFCH) on a PSFCH resource determined based on a slot index and a sub-channel index related to the first PSSCH. For example, the first device may restart the SL DRX inactivity timer after the PSFCH resource, based on that the second SCI is related to groupcast.

In an embodiment, a first device performing wireless communication is provided. The first device may include: one or more memories storing instructions: one or more transceivers; and one or more processors coupling the one or more memories and the one or more transceivers. The one or more processors may execute the instructions to obtain an SL DRX configuration including an SL DRX inactivity timer, an SL DRX HARQ RTT timer, and an SL DRX retransmission timer: receive first SCI for scheduling of a first PSSCH and second SCI from a second device through a first PSCCH, receive the second SCI and a first MAC PDU from the second device through the first PSSCH, start the SL DRX inactivity timer, transmit SL HARQ feedback information to the second device through a PSFCH on a PSFCH resource determined based on a slot index and a sub-channel index related to the first PSSCH, and restart the SL DRX inactivity timer after the PSFCH resource, based on that the second SCI is related to groupcast.

In an embodiment, an apparatus configured to control a first user equipment (UE) is provided. The apparatus may include: one or more processors; and at least one memory operatively coupled to the one or more processors and storing instructions. The one or more processors may execute the instructions to obtain an SL DRX configuration including an SL DRX inactivity timer, an SL DRX HARQ RTT timer, and an SL DRX retransmission timer, receive first SCI for scheduling of a first PSSCH and second SCI from a second device through a first PSCCH, receive the second SCI and a first MAC PDU from the second device through the first PSSCH, start the SL DRX inactivity timer, transmit SL HARQ feedback information to the second device through a PSFCH on a PSFCH resource determined based on a slot index and a sub-channel index related to the first PSSCH, and restart the SL DRX inactivity timer after the PSFCH resource, based on that the second SCI is related to groupcast.

In an embodiment, a non-transitory computer-readable medium having instructions recorded thereon is proposed. The instructions, when executed by one or more processors, may cause the one or more processors to allow a first device to obtain an SL DRX configuration including an SL DRX inactivity timer, an SL DRX HARQ RTT timer, and an SL DRX retransmission timer, allow the first device to receive first SCI for scheduling of a first PSSCH and second SCI from a second device through a first PSCCH, allow the first device to receive the second SCI and a first MAC PDU from the second device through the first PSSCH, allow the first device to start the SL DRX inactivity timer, allow the first device to transmit SL HARQ feedback information to the second device through a PSFCH on a PSFCH resource determined based on a slot index and a sub-channel index related to the first PSSCH, and allow the first device to restart the SL DRX inactivity timer after the PSFCH resource, based on that the second SCI is related to groupcast.

In an embodiment, a method by which a second device performs wireless communication is proposed. The second device may obtain an SL DRX configuration including an SL DRX inactivity timer, an SL DRX HARQ RTT timer, and an SL DRX retransmission timer. For example, the second device may transmit first SCI for scheduling of a first PSSCH and second SCI to a first device through a first PSCCH. For example, the second device may transmit the second SCI and a first MAC PDU to the first device through the first PSSCH. For example, the second device may start the SL DRX inactivity timer. For example, the second device may receive SL HARQ feedback information from the first device through a PSFCH on a PSFCH resource determined based on a slot index and a sub-channel index related to the first PSSCH. For example, the second device may restart the SL DRX inactivity timer after the PSFCH resource, based on that the second SCI is related to groupcast.

In an embodiment, a second device performing wireless communication is provided. The second device may include: one or more memories storing instructions: one or more transceivers; and one or more processors coupling the one or more memories and the one or more transceivers. The one or more processors may execute the instructions to obtain an SL DRX configuration including an SL DRX inactivity timer, an SL DRX HARQ RTT timer, and an SL DRX retransmission timer, transmit first SCI for scheduling of a first PSSCH and second SCI to a first device through a first PSCCH, transmit the second SCI and a first MAC PDU to the first device through the first PSSCH, start the SL DRX inactivity timer, receive SL HARQ feedback information from the first device through a PSFCH on a PSFCH resource determined based on a slot index and a sub-channel index related to the first PSSCH, and restart the SL DRX inactivity timer after the PSFCH resource, based on that the second SCI is related to groupcast.

In an embodiment, an apparatus configured to control a second UE is provided. The apparatus may include: one or more processors; and at least one memory operatively coupled to the one or more processors and storing instructions. The one or more processors may execute the instructions to obtain an SL DRX configuration including an SL DRX inactivity timer, an SL DRX HARQ RTT timer, and an SL DRX retransmission timer. The one or more processors may execute the instructions to transmit first SCI for scheduling of a first PSSCH and second SCI to a first UE through a first PSCCH, transmit the second SCI and a first MAC PDU to the first UE through the first PSSCH, start the SL DRX inactivity timer, receive SL HARQ feedback information to the first UE through a PSFCH on a PSFCH resource determined based on a slot index and a sub-channel index related to the first PSSCH, and restart the SL DRX inactivity timer after the PSFCH resource, based on that the second SCI is related to groupcast.

In an embodiment, a non-transitory computer-readable medium having instructions recorded thereon is proposed. The instructions, when executed by one or more processors, may cause the one or more processors to allow a second device to obtain an SL DRX configuration including an SL DRX inactivity timer, an SL DRX HARQ RTT timer, and an SL DRX retransmission timer, allow the second device to transmit first SCI for scheduling of a first PSSCH and second SCI to a first device through a first PSCCH, allow the second device to transmit the second SCI and a first MAC PDU from the first device through the first PSSCH, allow the second device to start the SL DRX inactivity timer, allow the second device to receive SL HARQ feedback information from the first device through a PSFCH on a PSFCH resource determined based on a slot index and a sub-channel index related to the first PSSCH, and allow the second device to restart the SL DRX inactivity timer after the PSFCH resource, based on that the second SCI is related to groupcast.

A UE can efficiently perform sidelink communication.

BRIEF DESCRIPTION OF THE DRAWINGS

FIG. 2 shows a radio protocol architecture, based on an embodiment of the present disclosure.

FIG. 10 shows a procedure of performing an SL DRX operation, according to an embodiment of the present disclosure.

FIG. 19 shows a vehicle or an autonomous vehicle, based on an embodiment of the present disclosure.

DETAILED DESCRIPTION

Figure 1:
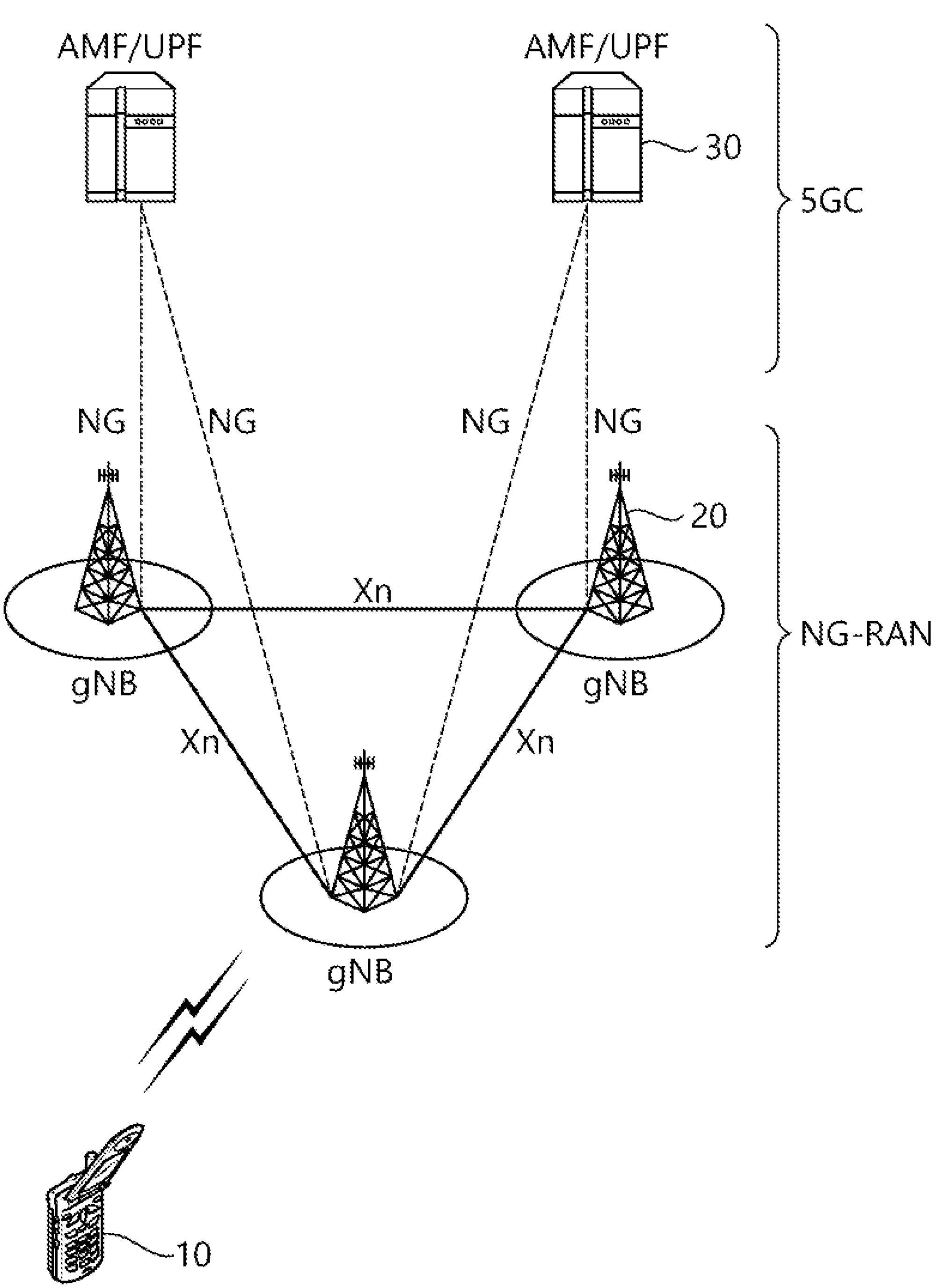
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A. B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, "when, if, or in case of" may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHZ, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication, (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QOS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QOS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
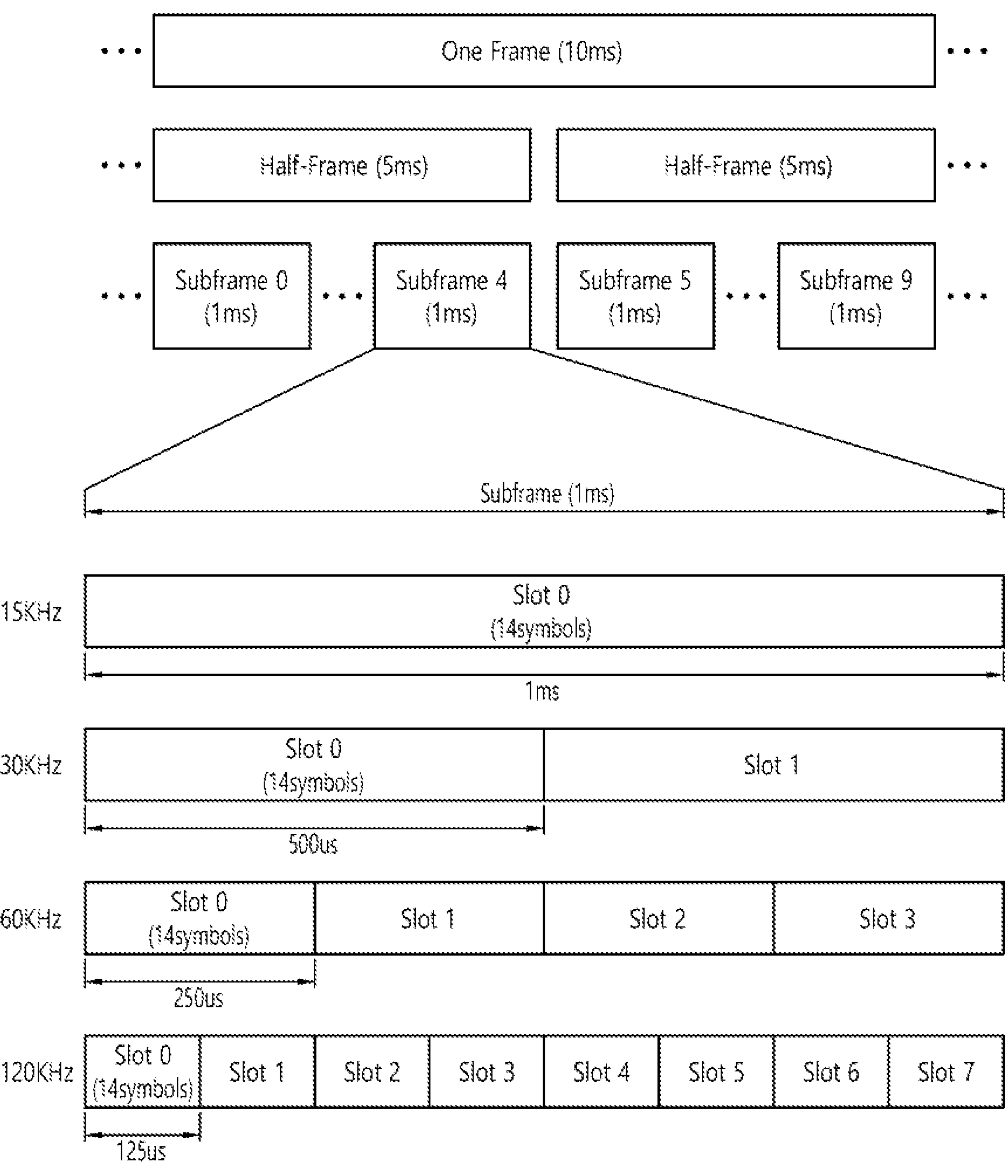
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*$2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 KHz/60 kHz a dense-urban, lower latency, wider carrier bandwidth may be supported. In case the SCS is 60 KHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
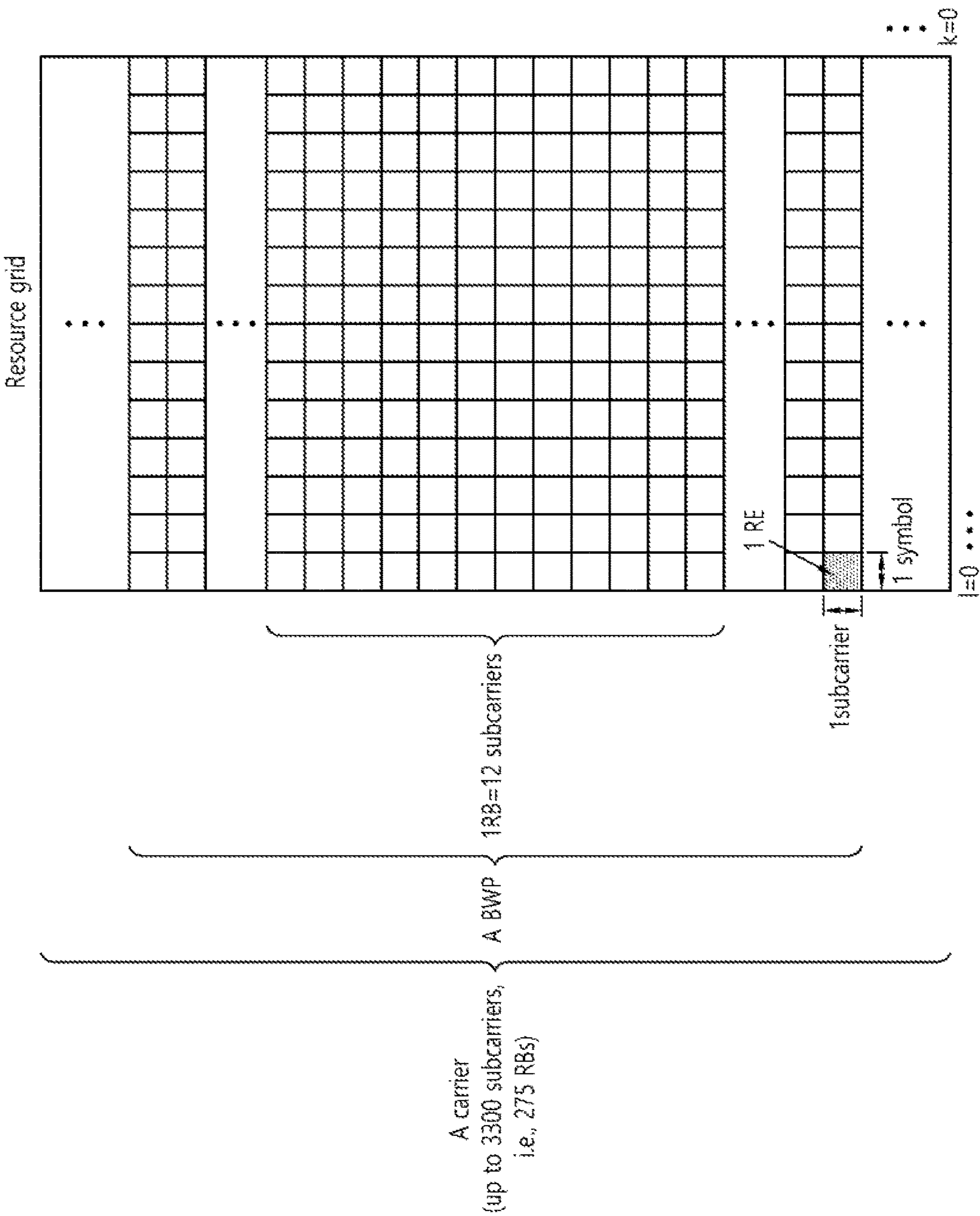
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS. CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
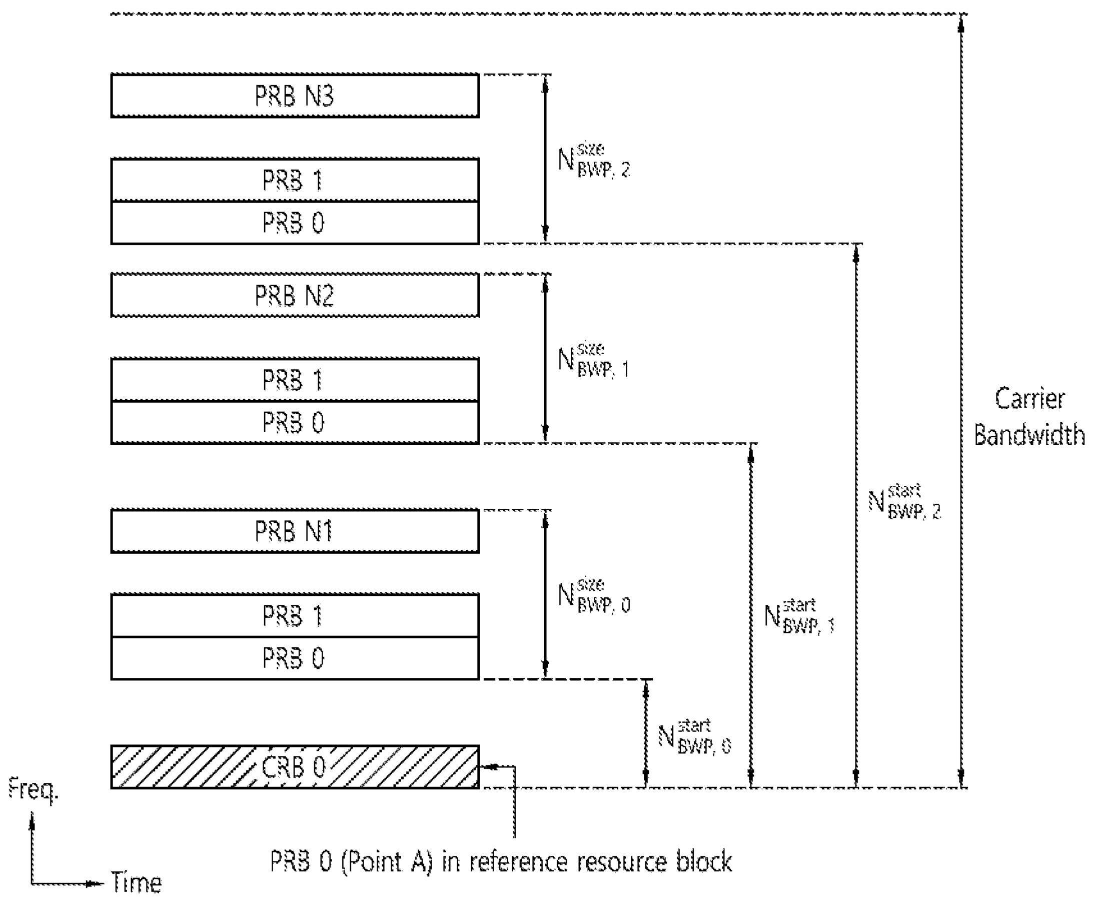
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
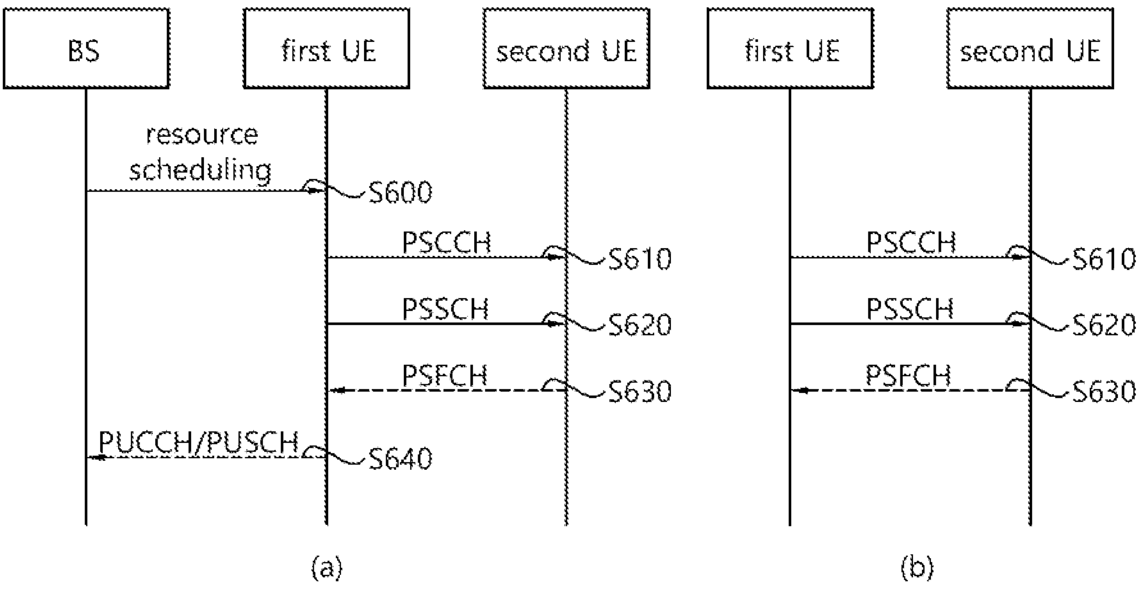
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a 2nd SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and $2^{nd}$-stage-SCI on PSSCH.

The following information is transmitted by means of the SCI format 1-A:

Priority—3 bits

Frequency resource assignment—ceiling $(\log_2(N^{SL}_{subChannel}(N^{SL}_{subChannel}+1)/2))$ bits when the value of the higher layer parameter sl-MaxNumPerReserve is configured to 2: otherwise ceiling log $2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2: otherwise 9 bits when the value of the higher layer parameter sl-MaxNumPerReserve is configured to 3

Resource reservation period—ceiling $(\log_2 N_{rsv\_period})$ bits, where $N_{rsv\_period}$ is the number of entries in the higher layer parameter sl-ResourceReservePeriodList, if higher layer parameter sl-MultiReserveResource is configured: 0 bit otherwise DMRS pattern—ceiling $(\log_2 N_{pattern})$ bits, where $N_{pattern}$ is the number of DMRS patterns configured by higher layer parameter sl-PSSCH-DMRS-TimePatternList 2nd-stage SCI format—2 bits as defined in Table 5

Beta_offset indicator—2 bits as provided by higher layer parameter sl-BetaOffsets 2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
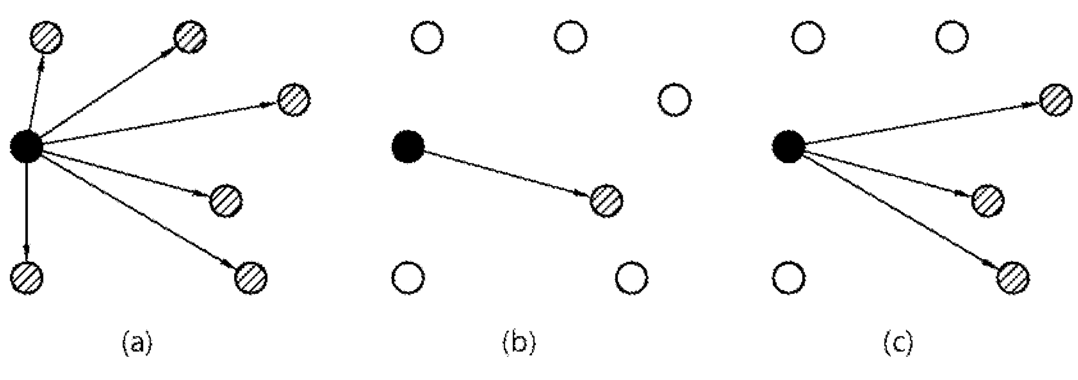
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure. SL groupcast communication may be replaced with SL multicast communication. SL one-to-many communication, or the like.

Hereinafter, a hybrid automatic repeat request (HARQ) procedure will be described.

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure, HARQ-ACK may be referred to as ACK, ACK information, or positive-ACK information, and HARQ-NACK may be referred to as NACK, NACK information, or negative-ACK information.

Hereinafter, UE procedure for reporting HARQ-ACK on sidelink will be described.

A UE can be indicated by an SCI format scheduling a PSSCH reception, in one or more sub-channels from a number of $N^{SCH}_{subch}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled. A UE expects that a slot $t'^{SL}_k$ $(0) \le k < T'_{max})$ has a PSFCH transmission occasion resource if k mod $N^{PSFCH}_{PSSCH} = 0)$, where $t'^{SL}_k$ is a slot that belongs to the resource pool, T'max is a number of slots that belong to the resource pool within 10240 msec, and $N^{PSFCH}_{PSSCH}$ is provided by sl-PSFCH-Period-r16. A UE may be indicated by higher layers to not transmit a PSFCH in response to a PSSCH reception. If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of $M^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots related to a PSFCH slot that is less than or equal to $N^{PSFCH}_{PSSCH}$, the UE allocates the $[(i+j \cdot N^{PSFCH}_{PSSCH}) \cdot M^{PSFCH}_{subch,slot}, (i+1+j \cdot N^{PSFCH}_{PSSCH}) \cdot M^{PSFCH}_{subch,slot}-1]$ PRBs from the $M_{PRB,set}^{PSFCH}$ PRBs to slot i among the PSSCH slots related to the PSFCH slot and sub-channel j, where $M^{PSFCH}_{subch,slot} = M^{FCH}_{PRB,set}/(N_{subch} \cdot N^{PSFCH}_{PSSCH})$, $0) \le i < N^{PSECH}_{PSSCH}$, $0) \le j < N_{subch}$, and the allocation starts in an ascending order of i and continues in an ascending order of j. The UE expects that $M^{PSFCH}_{PRB,set}$ is a multiple of $N_{subch} \cdot N^{PSFCH}_{PSSCH}$.

A UE determines a number of PSFCH resources available for multiplexing HARQ-ACK information in a PSFCH transmission as $R^{PSFCH}_{PRB,CS} = N^{PSFCH}_{type} \cdot M^{PSFCH}_{subch,slot} \cdot N^{PSFCH}_{CS}$ where $N^{PSFCH}_{CS}$ is a number of cyclic shift pairs for the resource pool and, based on an indication by higher layers, $N^{PSFCH}_{type}=1$ and the $M^{PSFCH}_{subch,slot}$ PRBs are related to the starting sub-channel of the corresponding PSSCH $N^{PSFCH}_{type}=N^{PSSCH}_{subch}$ and the $N^{PSSCH}_{subch} \cdot M^{PSFCH}_{subch,slot}$ PRBs are related to one or more sub-channels from the $N^{PSSCH}_{subch}$ sub-channels of the corresponding PSSCH The PSFCH resources are first indexed according to an ascending order of the PRB index, from the $N^{PSFCH}_{type} \cdot M^{PSFCH}_{subch,slot}$ PRBs, and then according to an ascending order of the cyclic shift pair index from the $N^{PSFCH}_{CS}$ cyclic shift pairs.

A UE determines an index of a PSFCH resource for a PSFCH transmission in response to a PSSCH reception as $(P_{ID}+M_{ID}) \bmod R^{PSFCH}_{PRB,CS}$ Where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01": otherwise, $M_{ID}$ is zero.

A UE determines a $m_0$ value, for computing a value of cyclic shift α, from a cyclic shift pair index corresponding to a PSFCH resource index and from $N^{PSFCH}_{CS}$ using Table 8.

TABLE 8

| | $m_0$ | | | | | |
|---|---|---|---|---|---|---|
| $N^{PSFCH}_{CS}$ | cyclic shift pair index 0 | cyclic shift pair index 1 | cyclic shift pair index 2 | cyclic shift pair index 3 | cyclic shift pair index 4 | cyclic shift pair index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift α, as in Table 9 if the UE detects a SCI format 2-A with Cast type indicator field value of "01" or "10", or as in Table 10 if the UE detects a SCI format 2-B or a SCI format 2-A with Cast type indicator field value of "11". The UE applies one cyclic shift from a cyclic shift pair to a sequence used for the PSFCH transmission.

TABLE 9

| HARQ-ACK Value | 0 (NACK) | 1 (ACK) |
|---|---|---|
| Sequence cyclic shift | 0 | 6 |

TABLE 10

| HARQ-ACK Value | 0 (NACK) | 1 (ACK) |
|---|---|---|
| Sequence cyclic shift | 0 | N/A |

Hereinafter, a procedure for a UE to report HARQ-ACK in an uplink will be described.

For reporting HARQ-ACK information generated by a UE based on HARQ-ACK information obtained by the UE from a PSFCH reception or from an absence of PSFCH reception, the UE may be provided with a PUCCH resource or a PUSCH resource. A UE reports HARQ-ACK information for a primary cell of a PUCCH group among cells in which the UE monitors a PDCCH for detection of DCI format 3_0.

For type 1 or type 2 SL configuration grant PSSCH transmission by a UE within a time period provided by sl-PeriodCG, the UE generates HARQ-ACK information in response to PSFCH reception in order to multiplex within a PUCCH transmission occasion after the last time resource in a set of time resources.

For each PSFCH reception opportunity among PSFCH reception opportunities, the UE generates HARQ-ACK information to be reported during PUCCH or PUSCH transmission. A UE may be indicated in SCI format to do one of the following, and a UE configures a HARQ-ACK codeword using HARQ-ACK information if applicable. Here, as one of the following for a UE to perform:

if a UE receives a PSFCH related to SCI format 2-A having a cast type indicator field value of "10", the UE generates HARQ-ACK information with the same value as the HARQ-ACK information value determined when the UE receives a PSFCH within a PSFCH reception opportunity, and generates a NACK if it is determined that a PSFCH is not received within a PSFCH reception opportunity.

if a UE receives a PSFCH related to SCI format 2-A in which a cast type indicator field value is "01", among PSFCH resources corresponding to all ID $M_{ID}$s of a plurality of UEs expected to receive a PSSCH, the UE generates an ACK when determining an ACK among at least one PSFCH reception opportunity among the number of PSFCH reception opportunities: otherwise, the UE generates a NACK if a UE receives a PSFCH related to SCI format 2-B or SCI format 2-A having a cast type indicator field value of "11", when a UE determines an absence of PSFCH reception for each PSFCH reception opportunity among reception opportunities of PSFCH, the UE generate an ACK: otherwise, the UE generate a NACK.

After a UE transmits a PSSCH and receives a PSFCH in response to a PSFCH resource opportunity, a priority value of HARQ-ACK information is the same as a priority value of a PSSCH transmission related to a PSFCH reception opportunity providing HARQ-ACK information.

When a PSFCH is not received at any PSFCH reception opportunity related to PSSCH transmission within a resource provided by DCI format 3_0 including a CRC scrambled by SL-RNTI, due to prioritization, or if a UE is provided with PUCCH resources for reporting HARQ-ACK information within resources provided within a single period for a configured grant, a UE generates a NACK. A priority value of a NACK is the same as a priority value of a PSSCH that is not transmitted due to a prioritization.

If a UE does not transmit a PSCCH including an SCI format 1-A for scheduling a PSSCH among any of resources provided by a configured grant within a single period, and the UE is provided with a PUCCH resource for reporting HARQ-ACK information, the UE generates an ACK. A priority value of ACK is equal to the largest priority value among possible priority values for a configuration grant.

After the end of the last symbol of the last PSFCH reception opportunity, to report HARQ-ACK information that starts earlier than $(N+1)*(2048+144)*\kappa*2^{\mu}*T_e$, a UE does not expect to be provided with a PUCCH resource or a PUSCH resource among several PSFCH reception opportunities in which the UE generates HARQ-ACK information reported during PUCCH or PUSCH transmission.

$\mu=\min(\mu_{SL},\mu_{UL})$, where $\mu_{SL}$ is an SCS setting of an SL BWP and $\mu_{UL}$ is an SCS setting of an active UL BWP of a primary cell.

N is determined from u according to Table 11.

TABLE 11

| μ | N |
|---|---|
| 0 | 14 |
| 1 | 18 |
| 2 | 28 |
| 3t | 32 |

For the number of PSFCH reception opportunities that are related to PUCCH transmission and end with n slots, a UE provides HARQ-ACK information generated during PUCCH transmission within n+k slots according to overlapping conditions. Here, k is the number of slots indicated by a PSFCH-to-HARQfeedback timing indicator field (if present) among DCI formats indicating a slot related to PUCCH transmission to report HARQ-ACK information, or here, k may be provided by sl-PSFCH-ToPUCCH-CG-Type1-r16. Assuming that the start of a sidelink frame is the same as the start of a downlink frame, k=0 corresponds to the last slot for PUCCH transmission overlapping with the last PSFCH reception opportunity.

In the case of PSSCH transmission by a UE scheduled by a DCI format or in the case of type 2 PSSCH transmission of an SL configuration grant activated by a DCI format, in the DCI format, a PUCCH resource indicator field is 0), and when a value of a PSFCH-to-HARQ feedback timing indicator field (if present) is 0, it indicates to a UE that a PUCCH resource is not provided. Regarding transmission of Type 1 PSSCH of SL configured grant, a PUCCH resource may be provided by sl-NIPUCCH-AN-r16 and sl-PSFCH-To-PUCCH-CG-Type1-r16. If a PUCCH resource is not provided, a UE does not transmit a PUCCH including HARQ-ACK information generated from among a plurality of PSFCH reception opportunities.

In the case of PUCCH transmission including HARQ-ACK information, a UE determines a PUCCH resource set for the HARQ-ACK information bit and then determines a PUCCH resource. PUCCH resource determination has a PSFCH-to-HARQfeedback timing indicator field value indicating the same slot for PUCCH transmission, the UE detects it, and is based on a PUCCH resource indicator field for the last DCI format 3_0, among DCI format 3_0s related to transmitting the corresponding HARQ-ACK information in a PUCCH in which a DCI format detected by a UE for PUCCH resource determination is indexed in ascending order over PDCCH monitoring occasion indexes.

A UE does not expect to multiplex HARQ-ACK information about one or more SL configuration grants among the same PUCCH.

A priority value of PUCCH transmission including one or more sidelink HARQ-ACK information bits is a minimum priority value for one or more HARQ-ACK information bits. Hereinafter, a CRC for DCI format 3_0 is scrambled to SL-RNTI or SL-CS-RNTI.

An SL DRX configuration referred to in this disclosure may include at least one or more of the following parameters.

For example, an SL DRX configuration may include one or more of the information listed below:

(1) For example, SL drx-onDurationTimer may be information on the duration at the beginning of a DRX Cycle. For example, a start period of a DRX cycle may be information on a period in which a terminal operates in an active mode to transmit or receive sidelink data.

(2) For example, SL drx-SlotOffset may be information on a delay before starting a drx-onDurationTimer of a DRX-on duration timer.

(3) For example, SL drx-Inactivity Timer may be information on the duration after the PSCCH occasion in which a PSCCH indicates a new sidelink transmission and reception for the MAC entity. For example, when a transmitting terminal instructs PSSCH transmission through a PSCCH, the transmitting terminal operates in an active mode while an SL drx-Inactivity Timer is running, so that the transmitting terminal may transmit PSSCH to a receiving terminal. Also, for example, when a receiving terminal is instructed that a transmitting terminal transmits a PSSCH through PSCCH reception, the receiving terminal operates in an active mode while SL drx-Inactivity Timer is running, so that the receiving terminal may receive the PSSCH from the transmitting terminal.

(4) For example, SL drx-RetransmissionTimer may be information on the maximum duration until a retransmission is received. For example, SL drx-RetransmissionTimer may be configured per HARQ process.

(5) For example, SL drx-HARQ-RTT-Timer may be information on the minimum duration before an assignment for HARQ retransmission is expected by the MAC entity. For example, SL drx-HARQ-RTT-Timer may be configured per HARQ process.

(6) For example, SL drx-LongCycleStartOffset may be information on the Long DRX cycle and drx-StartOffset which defines the subframe where the Long and Short DRX Cycle starts.

(7) For example, SL drx-ShortCycle may be information on the Short DRX cycle. For example, SL drx-ShortCycle may be optional information.

(8) For example, SL drx-ShortCycleTimer may be information on the duration a UE shall follow the Short DRX cycle. For example, SL drx-ShortCycleTimer may be optional information.

(9) For example, SL drx-StartOffset may be information about the subframe where the SL DRX cycle starts.

(10) For example, SL drx-Cycle may be information about the SL DRX cycle.

The following SL DRX timer mentioned in this disclosure may be used for the following purposes.

(1) SL DRX on-duration timer: A period in which a UE performing an SL DRX operation should basically operate in an active time to receive a counterpart UE's PSCCH/PSSCH.

(2) SL DRX inactivity timer: A period in which a UE performing an SL DRX operation extends an SL DRX on-duration period, which is a period in which an active time is basically required to receive PSCCH/PSSCH of a counterpart UE.

For example, a UE may extend an SL DRX on-duration timer by an SL DRX inactivity timer period. Also, when a UE receives a new packet (e.g., new PSSCH transmission)

from a counterpart UE, the UE may start an SL DRX inactivity timer to extend the SL DRX on-duration timer.

For example, an SL DRX inactivity timer may be used to extend an SL DRX duration timer period, which is a period in which an RX UE performing an SL DRX operation should basically operate as an active time to receive a PSCCH/PSSCH of the other TX UE. That is, an SL DRX on-duration timer may be extended by an SL DRX inactivity timer period. In addition, when an RX UE receives a new packet (e.g., new PSSCH transmission) from a counterpart TX UE, the RX UE may start an SL DRX inactivity timer to extend the SL DRX on-duration timer.

(3) SL DRX HARQ RTT timer: A period in which a UE performing an SL DRX operation operates in a sleep mode until it receives a retransmission packet (or PSSCH assignment) transmitted by a counterpart UE.

For example, when a UE starts an SL DRX HARQ RTT timer, the UE may determine that a counterpart UE will not transmit a sidelink retransmission packet to it until the SL DRX HARQ RTT timer expires, and may operate in a sleep mode while the corresponding timer is running. For example, when a UE starts an SL DRX HARQ RTT timer, the UE may not monitor sidelink retransmission packets from a counterpart UE until the SL DRX HARQ RTT timer expires. For example, when an RX UE that has received a PSCCH/PSSCH transmitted by a TX UE transmits SL HARQ NACK feedback, the RX UE may start an SL DRX HARQ RTT timer. In this case, an RX UE may determine that a counterpart TX UE will not transmit a sidelink retransmission packet to it until an SL DRX HARQ RTT timer expires, and the RX UE may operate in a sleep mode while the corresponding timer is running.

(4) SL DRX retransmission timer: A timer that starts when an SL DRX HARQ RTT timer expires, and a period in which a UE performing SL DRX operation operates as an active time to receive a retransmission packet (or PSSCH assignment) transmitted by a counterpart UE.

For example, during the corresponding timer period, a UE may receive or monitor a retransmission sidelink packet (or PSSCH assignment) transmitted by a counterpart UE. For example, an RX UE may receive or monitor a retransmission sidelink packet (or PSSCH assignment) transmitted by a counterpart TX UE while an SL DRX retransmission timer is running.

The following Uu DRX timer mentioned in this disclosure may be used for the following purposes.

(1) Uu DRX HARQ RTT TimerSL

For example, the Uu DRX HARQ RTT TimerSL can be used in a period in which the UE performing the Uu DRX operation does not have to monitor DCI (PDCCH) for SL Mode 1 operation transmitted by the base station. That is, while the Uu DRX HARQ RTT TimerSL is operating, the UE may not need to monitor the PDCCH for SL Mode 1 operation. In other words, Uu DRX HARQ RTT TimerSL may mean a minimum duration before an SL retransmission grant is expected.

(2) Uu DRX Retransmission TimerSL

For example, it can be used in a period in which a UE performing a Uu DRX operation monitors DCI (PDCCH) for SL Mode 1 operation transmitted by a base station. That is, while Uu DRX Retransmission TimerSL is in operation, the UE can monitor the PDCCH transmitted by the base station for SL Mode 1 operation. In other words, Uu DRX Retransmission TimerSL may mean a maximum duration until an SL retransmission grant is received.

Figure 8:
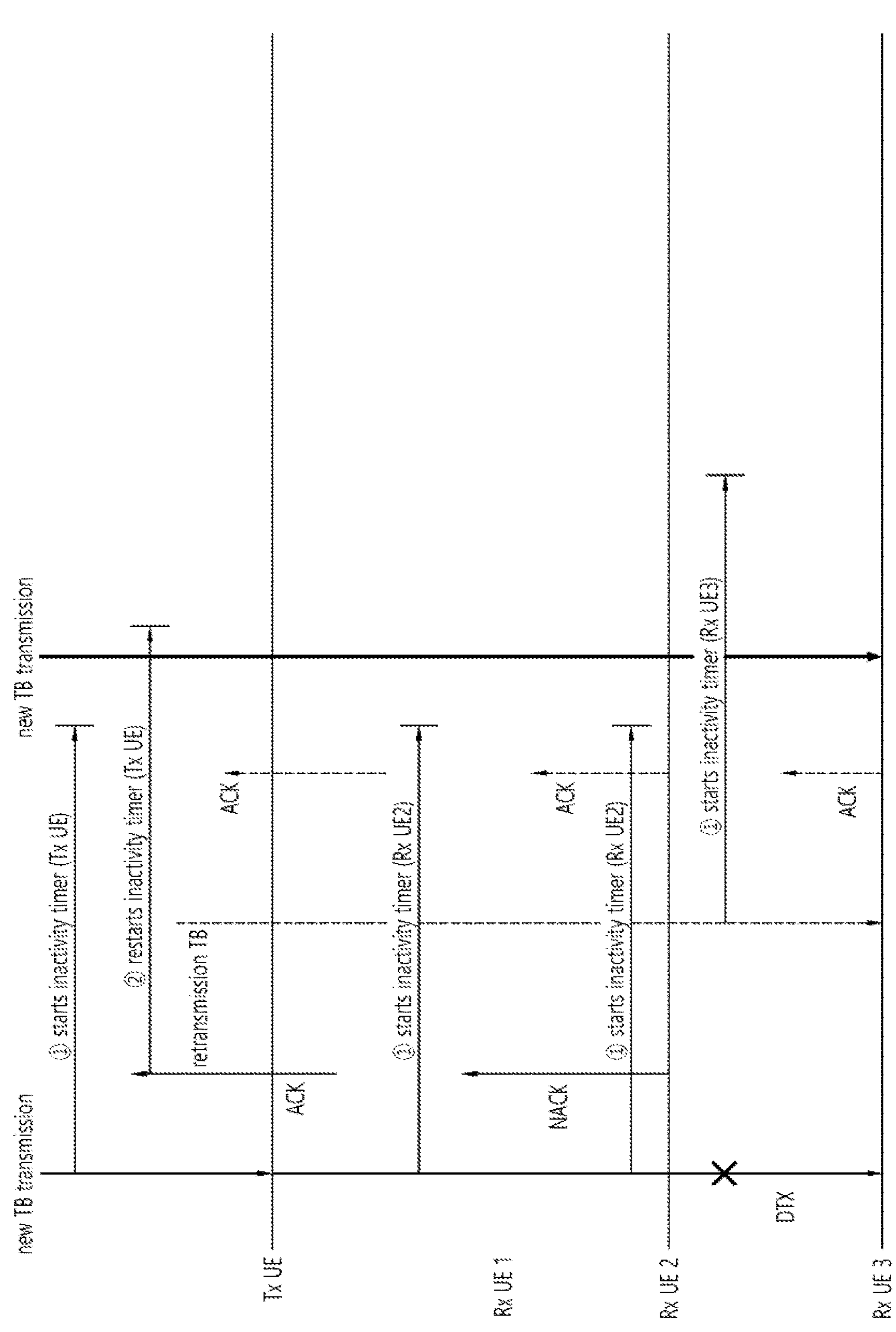
FIG. 8 shows a problem of a method of performing an SL DRX operation, according to an embodiment of the present disclosure.

FIG. 8 shows a problem of a method of performing an SL DRX operation, according to an embodiment of the present disclosure. The embodiment of FIG. 8 may be combined with various embodiments of the present disclosure.

Referring to FIG. 8, in an embodiment of the present disclosure, for example, a TX UE and an RX UE (e.g., an RX UE as a group member) may perform an SL DRX operation based on an SL DRX configuration in groupcast. For example, when all RX UEs belonging to a group transmit a transport block, the TX UE may start an SL DRX timer (e.g., an SL DRX inactivity timer) of the TX UE. For example, when some RX UEs (e.g., an RX UE 1, an RX UE 2) of the group member receive the transport block, some RX UEs of the group member may start the SL DRX timer (e.g., the SL DRX inactivity timer). For example, in case of a groupcast option 2, some RX UEs of the group member may transmit NACK information/ACK information for the transport block to the TX UE through a PSFCH, according to a decoding success/failure for the transport block. For example, some RX UEs of the group member may start an SL DRX HARQ RTT timer after transmitting the NACK information/ACK information. In addition, for example, the TX UE may receive the NACK/ACK information from the RX UE. For example, when the TX UE receives the NACK information from the RX UE, the TX UE may restart an SL DRX timer (e.g., an SL DRX inactivity timer) of the TX UE.

For example, some RX UEs (e.g., the RX UE 2) of the group member, which have transmitted NACK information, may start an SL DRX retransmission timer after the SL DRX HARQ RTT timer expires. For example, some RX UEs (e.g., the RX UE 1) of the group member, which have transmitted ACK information may be in an SL DRX ON state within a time during which the SL DRX timer of the RX UE runs. In addition, for example, some RX UE (e.g., the RX UE 1) of the group member, which have transmitted the ACK information, may be in an SL DRX OFF state after the SL DRX timer of the RX UE expires. For example, the TX UE may transmit the retransmission packet to the RX UE within the time during which the SL DRX retransmission timer runs. For example, some RX UEs (e.g., the RX UE 2) of the group member, which have transmitted NACK information, may receive the retransmission packet within the time during which the SL DRX retransmission timer runs, and some RX UEs (e.g., the RX UE 2) of the group member, which have transmitted the NACK information, may be in the SL DRX OFF state after the SL DRX retransmission timer expires. Likewise, for example, some RX UEs (e.g., the RX UE 1) of the group member, which have transmitted the ACK information, may receive the retransmission packet within the time during which the SL DRX timer runs, and some RX UEs (e.g., the RX UE 1) of the group member, which have transmitted the ACK information, may be in the SL DRX OFF state after the SL DRX timer expires.

Meanwhile, for example, some RX UEs (e.g., an RX UE 3) of the group member may not be able to receive the transport block transmitted by the TX UE within an active time of the TX UE irrespective of the decoding success/failure due to DTX transmission or the like. For example, when some RX UEs of the group member have not received the transport block, some RX UEs of the group member may not start the SL DRX timer (e.g., the SL DRX inactivity timer) of the RX UE. In addition, for example, some RX UEs of the group member may not transmit HARQ ACK/NACK information to the TX UE.

In addition, for example, some RX UEs of the group member may receive retransmission packets transmitted by TX UEs within an SL DRX ON time. For example, when some RX UEs of the group member receive the retransmission packet, some RX UEs of the group member may start the SL DRX timer (e.g., the SL DRX inactivity timer). For example, some RX UEs of the group member may transmit the HARQ ACK information to the TX UE through the PSFCH. In addition, for example, some RX UEs of the group member may sleep for an SL DRX OFF time from a time point at which the SL DRX timer (e.g., the SL DRX inactivity timer) expires.

For example, the TX UE may transmit a new transport block to all RX UEs belonging to the group by considering only an active time of the TX UE (i.e., a running time of an SL DRX timer (e.g., an SL DRX inactivity timer) which has restarted from a time point of receiving NACK information from the RX UE). For example, the RX UE may transmit the new transport block to all RX UEs belonging to the group for a time during which some RX UEs of the group member, which have transmitted NACK/ACK information, are in the SL DRX OFF state. Accordingly, for example, some RX UEs (e.g., the RX UE 3) belonging to the group may not be able to receive a transport block within a time during which the active time of the TX UE and an active time of the RX UE overlap. In particular, for example, some RX UEs belonging to the group may not be able to receive the new transport block other than the retransmission packet within the time during which the active time of the RX UE and the active time of the RX UE overlap.

Figure 9:
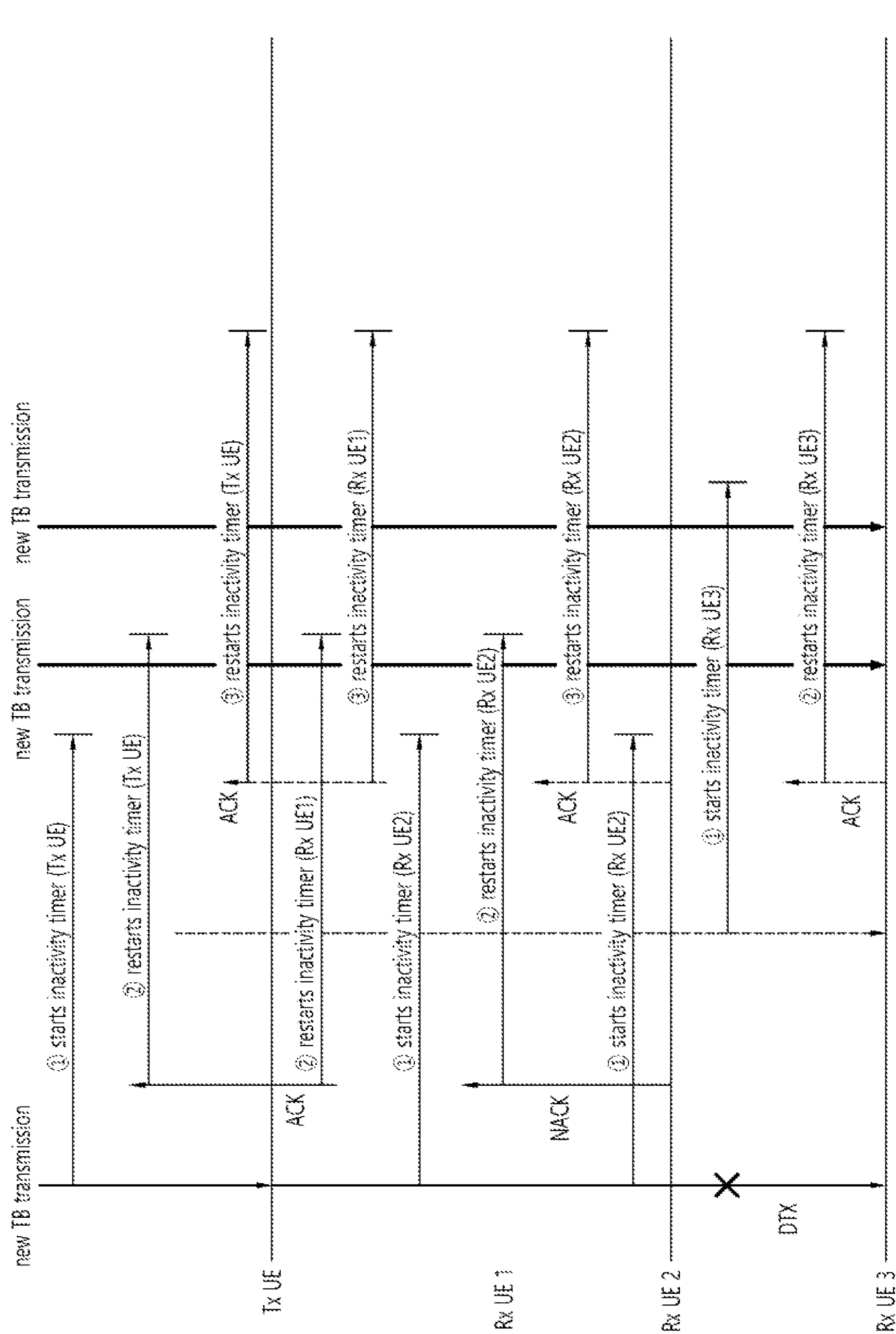
FIG. 9 shows a method of performing an SL DRX operation, according to an embodiment of the present disclosure.

FIG. 9 shows a method of performing an SL DRX operation, according to an embodiment of the present disclosure. The embodiment of FIG. 9 may be combined with various embodiments of the present disclosure.

Referring to FIG. 9, in an embodiment of the present disclosure, for example, a TX UE and an RX UE (e.g., an RX UE as a group member) may perform an SL DRX operation based on an SL DRX configuration in groupcast. For example, when all RX UEs belonging to a group transmit a transport block, the TX UE may start an SL DRX timer (e.g., an SL DRX inactivity timer) of the TX UE. For example, when some RX UEs (e.g., an RX UE 1, an RX UE 2) of the group member receive the transport block, some RX UEs of the group member may start the SL DRX timer (e.g., the SL DRX inactivity timer). For example, in case of a groupcast option 2, some RX UEs of the group member may transmit NACK information/ACK information for the transport block to the TX UE through a PSFCH, according to a decoding success/failure for the transport block.

For example, when the TX UE receives the NACK information and/or the ACK information from the RX UE, the TX UE may restart the SL DRX timer (e.g., the SL DRX inactivity timer) of the TX UE. For example, some RX UEs (e.g., the RX UE 2) of the group member, which have transmitted the NACK information, may start the SL DRX inactivity timer after a PSFCH resource (e.g., in a first slot after an end of the PSFCH resource). For example, some RX UEs (e.g., the RX UE 1) of the group member, which have transmitted the ACK information, may start the SL DRX inactivity timer after the PSFCH resource (e.g., in the first slot after the end of the PSFCH resource).

Meanwhile, for example, some RX UEs (e.g., an RX UE 3) of the group member may not be able to receive the transport block transmitted by the TX UE within an active time of the TX UE irrespective of the decoding success/failure due to DTX transmission or the like. For example, when some RX UEs of the group member have not received the transport block, some RX UEs of the group member may not start the SL DRX timer (e.g., the SL DRX inactivity timer) of the RX UE. In addition, for example, some RX UEs of the group member may not transmit HARQ ACK/NACK information to the TX UE. In addition, for example, some RX UEs of the group member may receive retransmission packets transmitted by TX UEs within an SL DRX ON time. For example, when some RX UEs of the group member receive the retransmission packet, some RX UEs of the group member may start the SL DRX timer (e.g., the SL DRX inactivity timer). For example, some RX UEs of the group member may transmit the HARQ ACK information to the TX UE through the PSFCH.

For example, a new transport block may be transmitted to all RX UEs belonging to the group by considering only an active time of the TX UE (i.e., a running time of an SL DRX timer (e.g., an SL DRX inactivity timer) which has restarted from a time point of receiving NACK information from the RX UE). For example, all RX UEs in the group may receive the new transport block (TB) within the running time of the SL DRX inactivity timer.

In addition, for example, when the TX UE receives the ACK information and/or the NACK information from the RX UE, the TX UE may stop and/or restart the SL DRX timer (e.g., the SL DRX inactivity timer) of the TX UE. For example, some RX UEs (e.g., the RX UEs 1 and 2) of the group member, which have transmitted the NACK/ACK information for the second time, may stop and/or r-start the SL DRX inactivity timer after a PSFCH resource (e.g., in a first slot after an end of the PSFCH resource). For example, some RX UEs (e.g., the RX UE 3) of the group member, which have transmitted the NACK/ACK information for the first time, may stop and/or restart the SL DRX inactivity timer after the PSFCH resource (e.g., in the first slot after the end of the PSFCH resource).

Accordingly, for example, the new TB may be transmitted to all RX UEs belonging to the group by considering only an active time of the TX UE (i.e., a running time of an SL DRX timer (e.g., an SL DRX inactivity timer) which has restarted from a time point of receiving NACK information from the RX UE)). For example, all RX UEs in the group may receive the new TB within the running time of the SL DRX inactivity timer.

Therefore, according to an embodiment of the present disclosure, the TX UE may recognize a (re)start time point of different SL DRX timers of RX UEs depending on a transport block or retransmission packet transmitted by the TX UE. Accordingly, for example, the TX UE may transmit the new TB to all RX UEs belonging to the group by considering both the active time of the TX UE and the active time of the RX UE. Accordingly, for example, all RX UEs (e.g., the RX UE 3) belonging to the group may receive a transport block within a time during which the active time of the TX UE and the active time of the RX UE overlap. In particular, for example, the retransmission packet and the new transport block may be received within the time during which all RX UEs (e.g., the RX UE 3) belonging to the group and the active time of the RX UE overlap.

FIG. 10 shows a procedure of performing an SL DRX operation, according to an embodiment of the present disclosure. The embodiment of FIG. 10 may be combined with various embodiments of the present disclosure.

Referring to FIG. 10, in step S1010, a TX UE and/or at least one (e.g., group member) RX UE performing sidelink groupcast communication or sidelink broadcast communication may obtain an SL DRX configuration including information related to an SL DRX inactivity timer, an SL DRX HARQ RTT timer, and/or an SL DRX retransmission timer (e.g., based on an RRC connection). In step S1020, the TX UE and/or the RX UE may start/trigger a sidelink DRX cycle. In step S1030, the TX UE may transmit first SCI (for scheduling of a first PSSCH and second SCI transmitted through the first PSSCH) to the RX UE through a first PSCCH. In step S1032, the RX UE may transmit the second SCI and a first MAC PDU to the RX UE through the first PSSCH. For example, the second SCI may be related to groupcast. In step S1040/step S1042, the RX UE/TX UE may start/trigger respective SL DRX inactivity timers of the RX UE/RX UE. In step S1050, the RX UE may transmit SL HARQ feedback information (e.g., HARQ ACK information/NACK information) to the TX UE through a PSFCH on a PSFCH resource. For example, the PSFCH resource may be determined based on a slot index and a sub-channel index related to the PSSCH. In step S1060, the RX UE may restart/retrigger the SL DRX inactivity timer after the PSFCH resource, based on transmitting of the SL HARQ feedback information (e.g., HARQ ACK information/NACK information) to the TX UE. For example, the RX UE may stop the SL DRX inactivity timer after the PSFCH resource and restart/retrigger the SL DRX inactivity timer, based on transmitting of the SL HARQ feedback information (e.g., HARQ ACK information/NACK information) to the TX UE. In step S1062, the TX UE may restart/retrigger the SL DRX inactivity timer after the PSFCH resource, based on receiving of the SL HARQ feedback information from the RX UE. For example, the TX UE may stop the SL DRX inactivity timer after the PSFCH resource and restart/retrigger the SL DRX inactivity timer, based on receiving of the SL HARQ feedback information (e.g., HARQ ACK information/NACK information). In step S1064, the TX UE may transmit a retransmission packet (e.g., a retransmission TB) to the RX UE. In step S1070, the TX UE may transmit third SCI to the RX UE to schedule fourth SCI and a second PSCH, through the second PSSCH. In step S1072, the TX UE may transmit the fourth SCI and a second MAC PDU to the RX UE through the second PSSCH.

According to an embodiment of the present disclosure, an SL DRX operation may be supported in Release 17 NR V2X. In addition, an operation of a sidelink DRX inactivity timer may be supported in sidelink groupcast. Therefore, a method of operating a sidelink DRX inactivity timer associated with groupcast sidelink transmission and sidelink reception may be proposed in embodiment(s) of the present disclosure.

Figure 11:
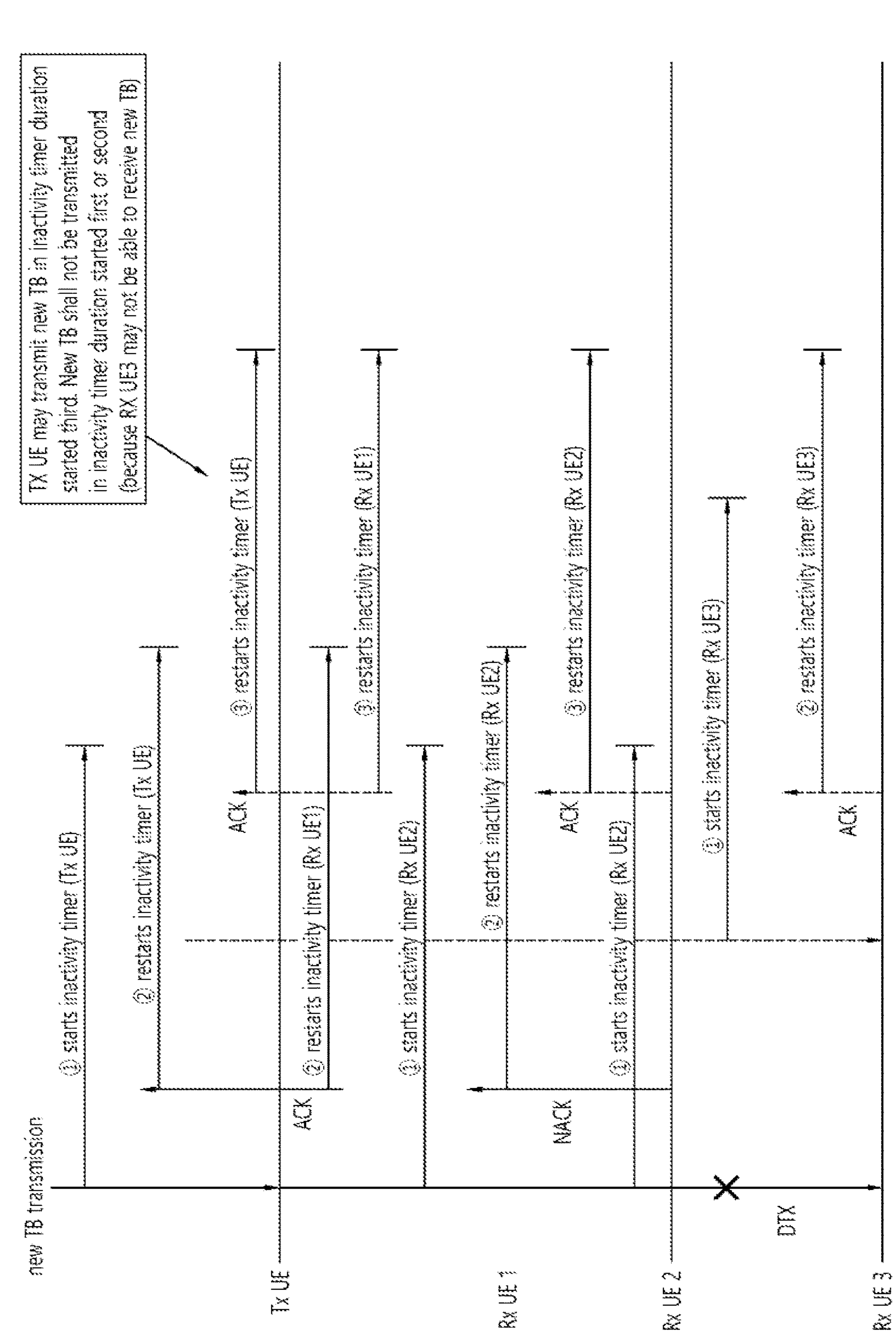
FIG. 11 shows a method of operating an SL DRX timer in sidelink groupcast, according to an embodiment of the present disclosure.

FIG. 11 shows a method of operating an SL DRX timer in sidelink groupcast, according to an embodiment of the present disclosure. The embodiment of FIG. 11 may be combined with various embodiments of the present disclosure.

Referring to FIG. 11, according to an embodiment of the present disclosure, for example, when a TX UE transmits a sidelink groupcast new transport block (TB), the TX UE may start a sidelink DRX inactivity timer of the TX UE. In addition, for example, when the TX UE receives an SL HARQ feedback (e.g., ACK information or NACK information) from group members after transmitting a PSCCH/PSSCH to the group members (e.g., RX UEs), the TX UE may restart the sidelink DRX inactivity timer. For example, when the TX UE transmits a new TB, instead that the TX UE performs an operation of transmitting the new TB by considering only the inactivity timer of the TX UE, the TX UE may transmit the new TB only in a duration in which an inactivity timer of a member UE belonging to the group overlaps. For example, the TX UE may transmit the new TB by considering a duration in which the inactivity timer of an RX UE which has transmitted the feedback last among group member UEs runs (e.g., the TX UE may transmit the new TB in a duration in which the inactivity timer of the RX UE which has transmitted the feedback last and an inactivity timer of another RX UE overlap and in which the inactivity timer duration of the TX UE overlaps). Alternatively, in another method, for example, the RX UE may receive a PSFCH (e.g., HARQ ACK information or NACK information) from all member UEs belonging to the group, and the TX UE may transmit the new TB in a duration in which the inactivity timer of all member UEs (e.g., RX UEs) and the inactivity timer of the TX UE overlap.

According to an embodiment of the present disclosure, for example, when the RX UE receives a sidelink groupcast new TB, the RX UE may start a sidelink DRX inactivity timer of the RX UE. In addition, for example, when the RX UE transmits an SL HARQ feedback (e.g., ACK information or NACK information) to the TX UE after receiving the PSCCH/PSSCH, the RX UE may restart the sidelink DRX inactivity timer.

Referring to FIG. 11, according to an embodiment of the present disclosure, for example, the TX UE and the RX UE may restart the sidelink DRX inactivity timer, based on PSFCH (e.g., HARQ ACK information/NACK information) transmission/reception. For example, the TX UE may transmit the new TB only in a duration in which the running inactivity timer of the group member UEs (e.g., RX UEs) (e.g., for RX UE 1/2/3) and the sidelink DRX inactivity timer of the TX UE overlap.

According to an embodiment of the present disclosure, for example, when the TX UE fails to perform PSFCH monitoring due to an uplink (UL)/SL prioritization or half duplex problem (e.g., a problem in that transmitting/receiving operations cannot be performed at the same time), the TX UE may not restart the SL DRX inactivity timer (e.g., this is because the RX UE may not perform PSFCH transmission due to PSCCH missing, when the TX UE skips PSFCH monitoring/receiving operations).

An embodiment of the present disclosure may be a solution which may also be extended/applied to a sidelink broadcast (or unicast) operation.

An embodiment of the present disclosure may have various effects. For example, according to an embodiment of the present disclosure, misalignment between a start time point of an SL DRX timer of a TX UE and a start time point of an SL DRX timer of all RX UEs belonging to a group may be resolved. For example, according to an embodiment of the present disclosure, the TX UE may transmit a new transport block (TB) within a time during which an active time of all RX UE belonging to the group and an active time of the TX UE overlap. For example, according to an embodiment of the present disclosure, the new TB may be successfully received by all RX UEs belonging to the group. For example, according to an embodiment of the present disclosure, the new TB may be successfully received even by an RX UE which has failed in receiving the new TB due to DTX.

According to an embodiment of the present disclosure, an SL DRX operation may be supported in Release 17 NR V2X. In embodiment(s) of the present disclosure, a method of operating an HARQ RTT timer of a UE in a sidelink DRX operation may be proposed.

In an embodiment of the present disclosure, a sidelink DRX HARQ RTT timer and a sidelink retransmission timer may operate as follows.

1. RX UE Operation

For example, when an RX UE receives a PSCCH/PSSCH (e.g., an HARQ feedback enabled MAC PDU) from a TX UE, the RX UE may start a sidelink DRX HARQ RTT timer. For example, the RX UE may not perform a PSCCH/PSSCH monitoring operation of the TX UE while the sidelink DRX HARQ RTT timer runs (e.g., or may operate in a sleep mode). For example, the RX UE may stop the sidelink HARQ RTT timer which is running at a PSFCH resource time point derived in SCI transmitted by the TX UE, and may transmit a PSFCH (e.g., sidelink HARQ ACK information or NACK information) to the TX UE. For example, the RX UE may transmit a PSFCH (e.g., sidelink HARQ ACK information or NACK information) to the TX UE, and (for example, immediately before transmission.) the RX UE may restart the sidelink DRX HARQ RTT timer. For example, the RX UE may start the sidelink DRX retransmission timer when the sidelink DRX HARQ RTT timer expires, and the RX UE may perform a PSCCH/PSSCH monitoring operation.

For example, a length of a sidelink DRX HARQ RTT timer may be set as follows. Options 1) and 2) may be implemented individually in combination with an embodiment of the present disclosure, and may be implemented simultaneously in combination with an embodiment of the present disclosure.

1) "Length of sidelink DRX HARQ RTT timer=Time (e.g., ms) or Slot/Subframe from a $2^{nd}$ SCI resource time point (e.g., or an SCI reception time point) indicated in SCI to a point at which a PSFCH resource starts"

For example, the sidelink DRX HARQ RTT timer may expire at a time point at which the RX UE transmits the PSFCH (e.g., a PSFCH resource point), and the RX UE may transmit the PSFCH and restart the sidelink DRX HARQ RTT timer. For example, even if the sidelink DRX HARQ RTT time expires at the PSFCH resource point, the RX UE may not start the sidelink retransmission timer. For example, a case of the sidelink DRX HARQ RTT timer which expires at the PSFCH resource point may be excluded from a start condition of the sidelink DRX retransmission timer.

2) "Length of sidelink DRX HARQ RTT timer=Time (e.g., ms) or Slot/Subframe from a $2^{nd}$ SCI resource time point (e.g., or an SCI reception time point) indicated in SCI to a next resource point indicated in the SCI"

2. TX UE Operation

According to an embodiment of the present disclosure, for example, when a TX UE transmits a PSCCH/PSSCH (e.g., an HARQ feedback enabled MAC PDU) to an RX UE, the TX UE may start a sidelink DRX HARQ RTT timer. The TX UE may not perform PSCCH/PSSCH transmission for sidelink data to the RX UE while the sidelink DRX HARQ RTT timer runs. For example, the TX UE may stop the sidelink DRX HARQ RTT timer which is running at a PSFCH resource time point indicated by SCI transmitted to the RX UE, and the TX UE may perform an operation of monitoring a PSFCH (e.g., sidelink HARQ ACK information or NACK information) which may be transmitted by the RX UE. For example, the TX UE may receive the PFSCH (e.g., sidelink HARQ ACK information or NACK information) from the RX UE and may restart the sidelink DRX HARQ RTT timer (e.g., at a PSFCH resource point). The TX UE may start a sidelink DRX retransmission timer when the sidelink DRX HARQ RTT timer expires, and may perform an operation of transmitting the PSCCH/PSSCH to the RX UE.

For example, a length of a sidelink DRX HARQ RTT timer may be set as follows. Options 1) and 2) may be implemented individually in combination with an embodiment of the present disclosure, and may be implemented simultaneously in combination with an embodiment of the present disclosure.

1) "Length of sidelink DRX HARQ RTT timer=Time (e.g., ms) or Slot/Subframe from a $2^{nd}$ SCI resource time point (e.g., or an SCI reception time point) indicated in SCI to a point at which a PSFCH resource starts". For example, the sidelink DRX HARQ RTT timer may expire at a time point at which the TX UE transmits the PSFCH (e.g., a PSFCH resource point), and for example, the TX UE may transmit the PSFCH and restart the sidelink DRX HARQ RTT timer. For example, even if the sidelink DRX HARQ RTT time expires at the PSFCH resource point, the TX UE may not start the sidelink retransmission timer. For example, a case of the sidelink DRX HARQ RTT timer which expires at the PSFCH resource point may be excluded from a start condition of the sidelink DRX retransmission timer.

2) "Length of sidelink DRX HARQ RTT timer=Time (e.g., ms) or Slot/Subframe from a $2^{nd}$ SCI resource time point (e.g., or an SCI reception time point) indicated in SCI to a next resource point indicated in the SCI"

An embodiment of the present disclosure may have various effects. For example, an embodiment of the present disclosure may enable an additional power saving operation (e.g., a sleep mode operation, or an operation in which PSCCH/PSSCH monitoring is not performed, or an operation in which the PSCCH/PSSCH transmission is not performed) until PSFCH transmission/reception (or a PSFCH resource point) after a time point at which a UE receives/transmits SCI, thereby increasing a power saving effect of the UE.

An operation of the present disclosure is a solution applicable to a sidelink groupcast/unicast operation.

A timer operation mentioned in the present disclosure is a solution commonly applicable to all sidelink DRX timer operations as follows.

SL DRX timer (e.g., a timer which allows a UE to operate at an active time for a timer duration)

For example, a sidelink DRX Onduration timer, a sidelink DRX inactivity timer, a sidelink DRX retransmission timer, or a sidelink DRX active time related timer.

In the present disclosure, names of timers (Sidelink DRX Onduration Timer. Sidelink DRX Inactivity Timer, Sidelink DRX HARQ RTT Timer. Sidelink DRX Retransmission Timer. Uu DRX HARQ RTT TimerSL. Uu DRX Retransmission TimerSL, etc.) are exemplary, and timers that perform the same/similar functions based on content described in each timer may be regarded as the same/similar timers regardless of their names.

The proposal of the present disclosure may be extended and applied to parameters (e.g., timers) included in UE-pair specific SL DRX configuration. UE-pair specific SL DRX pattern, or UE-pair specific SL DRX configuration, in addition to parameters (e.g., timers) included in default/common SL DRX configuration, default/common SL DRX patterns, or default/common SL DRX configuration.

In addition, an on-duration mentioned in the proposal of the present disclosure can be extended and interpreted as an active time period (e.g., time to wake-up state (e.g., RF module turned on) to receive/transmit radio signals), an off-duration may be extended and interpreted as a sleep time (e.g., a time for operating in a sleep mode state (e.g., a state in which an RF module is turned off) for power saving). It does not mean that a TX UE is obligated to operate in a sleep mode in a sleep time interval. If necessary, a TX UE may be allowed to operate in an active time for a while for a sensing operation and/or a transmission operation even in sleep time.

For example, whether the (part of) proposed method/rule of the present disclosure is applied and/or a related parameter (e.g., threshold) may be configured specifically (or differently or independently) for a resource pool. For example, whether the (part of) proposed method/rule of the present disclosure is applied and/or a related parameter (e.g., threshold) may be configured specifically (or differently or independently) for congestion level. For example, whether the (part of) proposed method/rule of the present disclosure is applied and/or a related parameter (e.g., threshold) may be configured specifically (or differently or independently) for a priority of a service. For example, whether the (part of) proposed method/rule of the present disclosure is applied and/or a related parameter (e.g., threshold) may be configured specifically (or differently or independently) for a service type. For example, whether the (part of) proposed method/rule of the present disclosure is applied and/or a related parameter (e.g., threshold) may be configured specifically (or differently or independently) for a QoS requirement (e.g., latency, reliability). For example, whether the (part of) proposed method/rule of the present disclosure is applied and/or a related parameter (e.g., threshold) may be configured specifically (or differently or independently) for PQI(5QI(5G QoS identifier) for PC5). For example, whether the (part of) proposed method/rule of the present disclosure is applied and/or a related parameter (e.g., threshold) may be configured specifically (or differently or independently) for a traffic type (e.g., a periodic generation or an aperiodic generation). For example, whether the (part of) proposed method/rule of the present disclosure is applied and/or a related parameter (e.g., threshold) may be configured specifically (or differently or independently) for an SL transmission resource allocation mode (e.g., mode 1 or mode 2).

For example, whether the proposed rule of the present disclosure is applied and/or related parameter setting values may be configured specifically (or differently or independently) for a resource pool. For example, whether the proposed rule of the present disclosure is applied and/or related parameter setting values may be configured specifically (or differently or independently) for a type of service/packet. For example, whether the proposed rule of the present disclosure is applied and/or related parameter setting values may be configured specifically (or differently or independently) for a priority of service/packet. For example, whether the proposed rule of the present disclosure is applied and/or related parameter setting values may be configured specifically (or differently or independently) for QOS requirements (e.g., URLLC/EMBB traffic, reliability, latency). For example, whether the proposed rule of the present disclosure is applied and/or related parameter setting values may be configured specifically (or differently or independently) for PQI. For example, whether the proposed rule of the present disclosure is applied and/or related parameter setting values may be configured specifically (or differently or independently) for a cast type (e.g., unicast, groupcast, broadcast). For example, whether the proposed rule of the present disclosure is applied and/or related parameter setting values may be configured specifically (or differently or independently) for (resource pool) congestion level (e.g., CBR). For example, whether the proposed rule of the present disclosure is applied and/or related parameter setting values may be configured specifically (or differently or independently) for SL HARQ feedback scheme (e.g., NACK-only feedback. ACK/NACK feedback). For example, whether the proposed rule of the present disclosure is applied and/or related parameter setting values may be configured specifically (or differently or independently) for HARQ Feedback Enabled MAC PDU transmission. For example, whether the proposed rule of the present disclosure is applied and/or related parameter setting values may be configured specifically (or differently or independently) for HARQ Feedback Disabled MAC PDU transmission. For example, whether the proposed rule of the present disclosure is applied and/or related parameter setting values may be configured specifically (or differently or independently) for whether PUCCH-based SL HARQ feedback reporting operation is set. For example, whether the proposed rule of the present disclosure is applied and/or related parameter setting values may be configured specifically (or differently or independently) for a resource reselection based on pre-emption or pre-emption. For example, whether the proposed rule of the present disclosure is applied and/or related parameter setting values may be configured specifically (or differently or independently) for a re-evaluation or reselection of resources based on re-evaluation.

For example, whether the proposed rule of the present disclosure is applied and/or related parameter setting values may be configured specifically (or differently or independently) for (L2 or L1) (source and/or destination) identifier. For example, whether the proposed rule of the present disclosure is applied and/or related parameter setting values may be configured specifically (or differently or independently) for (L2 or L1) (Combination of Source ID and Destination ID) Identifier. For example, whether the proposed rule of the present disclosure is applied and/or related parameter setting values may be configured specifically (or differently or independently) for (L2 or L1) (a combination of source ID and destination ID pair and cast type) identifier. For example, whether the proposed rule of the present disclosure is applied and/or related parameter setting values may be configured specifically (or differently or independently) for the direction of a pair of source layer ID and destination layer ID. For example, whether the proposed rule of the present disclosure is applied and/or related parameter setting values may be configured specifically (or differently or independently) for PC5 RRC connection/link. For example, whether the proposed rule of the present disclosure is applied and/or related parameter setting values may be configured specifically (or differently or independently) for the case of performing SL DRX. For example, whether the proposed rule of the present disclosure is applied and/or related parameter setting values may be configured specifically (or differently or independently) for SL mode type (e.g., resource allocation mode 1 or resource allocation mode 2). For example, whether the proposed rule of the present disclosure is applied and/or related parameter setting values may be configured specifically (or differently or independently) for a case of performing (a)periodic resource reservation.

The certain time referred to in the proposal of the present disclosure may refer to a time during which a UE operates as an active time for a predefined time in order to receive a sidelink signal or sidelink data from a counterpart UE. A certain time referred to in the proposal of the present disclosure may refer to a time during which a UE operates as an active time for a specific timer (e.g., a sidelink DRX retransmission timer, a sidelink DRX inactivity timer, or a timer that guarantees operation as active time in DRX operation of an RX UE) time in order to receive a sidelink signal or sidelink data from a counterpart UE. In addition, whether the proposal and proposal rule of the present disclosure are applied (and/or related parameter setting values) may also be applied to mmWave SL operation.

Figure 12:
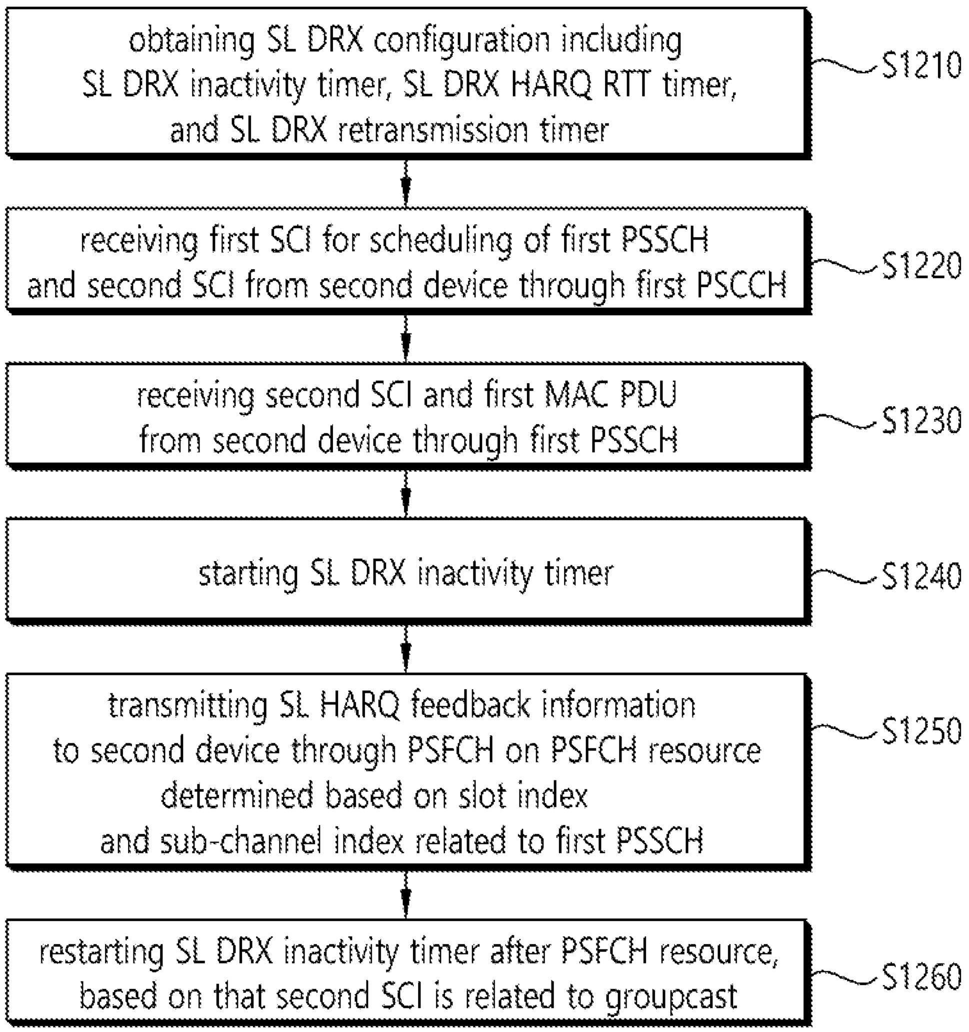
FIG. 12 shows a method for a first device to perform wireless communication, according to an embodiment of the present disclosure.

FIG. 12 shows a method by which a first device performs wireless communication, according to an embodiment of the present disclosure. The embodiment of FIG. 12 may be combined with various embodiments of the present disclosure.

Referring to FIG. 12, in step S1210, the first device may obtain a sidelink (SL) discontinuous reception (DRX) configuration including an SL DRX inactivity timer, an SL DRX hybrid automatic repeat request (HARQ) round-trip time (RTT) timer, and an SL DRX retransmission timer. In step S1220, for example, the first device may receive first sidelink control information (SCI) for scheduling of a first physical sidelink shard channel (PSSCH) and second SCI from a second device through a first physical sidelink control channel (PSCCH). In step S1230, for example, the first device may receive the second SCI and a first medium access control (MAC) protocol data unit (PDU) from the second device through the first PSSCH. In step S1240, the first device may start the SL DRX inactivity timer. In step S1250, for example, the first device may transmit SL HARQ feedback information to the second device through a physical sidelink feedback channel (PSFCH) on a PSFCH resource determined based on a slot index and a sub-channel index related to the first PSSCH. In step S1260, for example, the first device may restart the SL DRX inactivity timer after the PSFCH resource, based on that the second SCI is related to groupcast.

Additionally or alternatively, the SL DRX inactivity timer may be restarted after the PSFCH resource, based on that the second SCI is related to the groupcast and the SL DRX inactivity timer is running.

Additionally or alternatively, the SL DRX inactivity timer may be restarted after the PSFCH resource, based on that the second SCI is related to the groupcast and the SL HARQ feedback information is transmitted to the second device.

Additionally or alternatively, the second SCI may include information representing whether an SL HARQ feedback is enabled.

Additionally or alternatively, the information representing whether the SL HARQ feedback is enabled may be set to HARQ feedback enabled.

Additionally or alternatively, the SL HARQ feedback information may be any one of negative acknowledge (NACK) information and positive acknowledge (ACK).

Additionally or alternatively, the method may further include stopping the started SL DRX inactivity timer.

Additionally or alternatively, the SL DRX inactivity timer may be restarted after the PSFCH resource, based on that the second SCI is related to the groupcast and the SL DRX inactivity timer stops.

Additionally or alternatively, at least one of the SL DRX RTT timer and the SL DRX retransmission timer may not be started, based on the restarting of the SL DRX inactivity timer.

Additionally or alternatively, the starting of at least one of the SL DRX HARQ RTT timer and the SL DRX retransmission timer may be skipped, based on the restarting of the SL DRX inactivity timer.

Additionally or alternatively, a length of the SL DRX HARQ RTT timer may be 0).

Additionally or alternatively, the SL DRX inactivity timer may be started after the PSFCH resource, based on that the second SCI is related to the groupcast and the second SCI and the MAC PDU are received from the second device through the PSSCH.

Additionally or alternatively, the second SCI may include cast type information representing a NACK-ACK groupcast cast type.

Additionally or alternatively, the SL DRX inactivity timer may be restarted after the PSFCH resource, based on that the second SCI is related to the groupcast and based on the SL HARQ feedback information to be transmitted last among a plurality of pieces of SL HARQ feedback information to be transmitted to the second device.

Additionally or alternatively, the SL DRX inactivity timer may be restarted after the PSFCH resource, based on that the second SCI is related to the groupcast and based on the SL HARQ feedback information to be transmitted last among a plurality of pieces of SL HARQ feedback information to be transmitted to the second device within a running time of the SK DRX inactivity timer.

Additionally or alternatively, the first device may be at least one device included in a first group which performs groupcast communication with respect to the second device.

Additionally or alternatively, third SCI for scheduling of a second PSSCH and fourth SCI may be received from the second device through a second PSSCH, within a time during which the restarted SL DRX inactivity timer is running and a time during which the SL DRX inactivity timer of a third device is running.

Additionally or alternatively, the fourth SCI and a second MAC PDU may be received from the second device through the second PSSCH, within the time during which the restarted SL DRX inactivity timer is running and the time during which the SL DRX inactivity timer of the third device is running.

The proposed method may be applied to an apparatus according to various embodiments of the present disclosure. First, the processor 102 of the first device 100 may obtain an SL DRX configuration including an SL DRX inactivity timer, an SL DRX HARQ RTT timer, and an SL DRX retransmission timer. For example, the processor 102 of the first device 100 may control the transceiver 106 to receive first SCI for scheduling of a first PSSCH and second SCI from a second device through a first PSCCH. For example, the processor 102 of the first device 100 may control the transceiver 106 to receive the second SCI and a first MAC PDU from the second device through the first PSSCH. For example, the processor 102 of the first device 100 may start the SL DRX inactivity timer. For example, the processor 102 of the first device 100 may control the transceiver 106 to transmit SL HARQ feedback information to the second device through a PSFCH on a PSFCH resource determined based on a slot index and a sub-channel index related to the first PSSCH. For example, the processor 102 of the first device 100 may restart the SL DRX inactivity timer after the PSFCH resource, based on that the second SCI is related to groupcast.

According to an embodiment of the present disclosure, a first device performing wireless communication may be provided. The first device may include: one or more memories storing instructions: one or more transceivers; and one or more processors coupling the one or more memories and the one or more transceivers. The one or more processors may execute the instructions to obtain a SL DRX configuration including an SL DRX inactivity timer, an SL DRX HARQ RTT timer, and an SL DRX retransmission timer. For example, the one or more processors may receive first SCI for scheduling of a first PSSCH and second SCI from a second device through a first PSCCH. For example, the one or more processors may execute the instructions to receive the second SCI and a first MAC PDU from the second device through the first PSSCH. For example, the one or more processors may execute the instructions to start the SL DRX inactivity timer. For example, the one or more processors may execute the instructions to transmit SL HARQ feedback information to the second device through a PSFCH on a PSFCH resource determined based on a slot index and a sub-channel index related to the first PSSCH. For example, the one or more processors may execute the instructions to restart the SL DRX inactivity timer after the PSFCH resource, based on that the second SCI is related to group-cast.

According to an embodiment of the present disclosure, an apparatus configured to control a first UE may be provided. The apparatus may include: one or more processors; and at least one memory operatively coupled to the one or more processors and storing instructions. The one or more processors may execute the instructions to obtain an SL DRX configuration including an SL DRX inactivity timer, an SL DRX HARQ RTT timer, and an SL DRX retransmission timer. For example, the one or more processors may execute the instructions to receive first SCI for scheduling of a first PSSCH and second SCI from a second UE through a first PSCCH. For example, the one or more processors may execute the instructions to receive the second SCI and a first medium MAC PDU from the second UE through the first PSSCH. For example, the one or more processors may execute the instructions to start the SL DRX inactivity timer. For example, the one or more processors may execute the instructions to transmit SL HARQ feedback information to the second UE through a PSFCH on a PSFCH resource determined based on a slot index and a sub-channel index related to the first PSSCH. For example, the one or more processors may execute the instructions to restart the SL DRX inactivity timer after the PSFCH resource, based on that the second SCI is related to groupcast.

According to an embodiment of the present disclosure, a non-transitory computer-readable medium having instructions recorded thereon may be provided. The instructions, when executed by one or more processors, may cause the one or more processors to allow a first device to obtain an SL DRX configuration including an SL DRX inactivity timer, an SL DRX HARQ RTT timer, and an SL DRX retransmission timer. For example, the instructions, when executed by one or more processors, may cause the one or more processors to allow the first device to receive first SCI for scheduling of a first PSSCH and second SCI from a second device through a first PSCCH. For example, the instructions, when executed by one or more processors, may cause the one or more processors to allow the first device to receive the second SCI and a first MAC PDU from the second device through the first PSSCH. For example, the instructions, when executed by one or more processors, may cause the one or more processors to allow the first device to start the SL DRX inactivity timer. For example, the instructions, when executed by one or more processors, may cause the one or more processors to allow the first device to transmit SL HARQ feedback information to the second device through a PSFCH on a PSFCH resource determined based on a slot index and a sub-channel index related to the first PSSCH. For example, the instructions, when executed by one or more processors, may cause the one or more processors to allow the first device to restart the SL DRX inactivity timer after the PSFCH resource, based on that the second SCI is related to groupcast.

Figure 13:
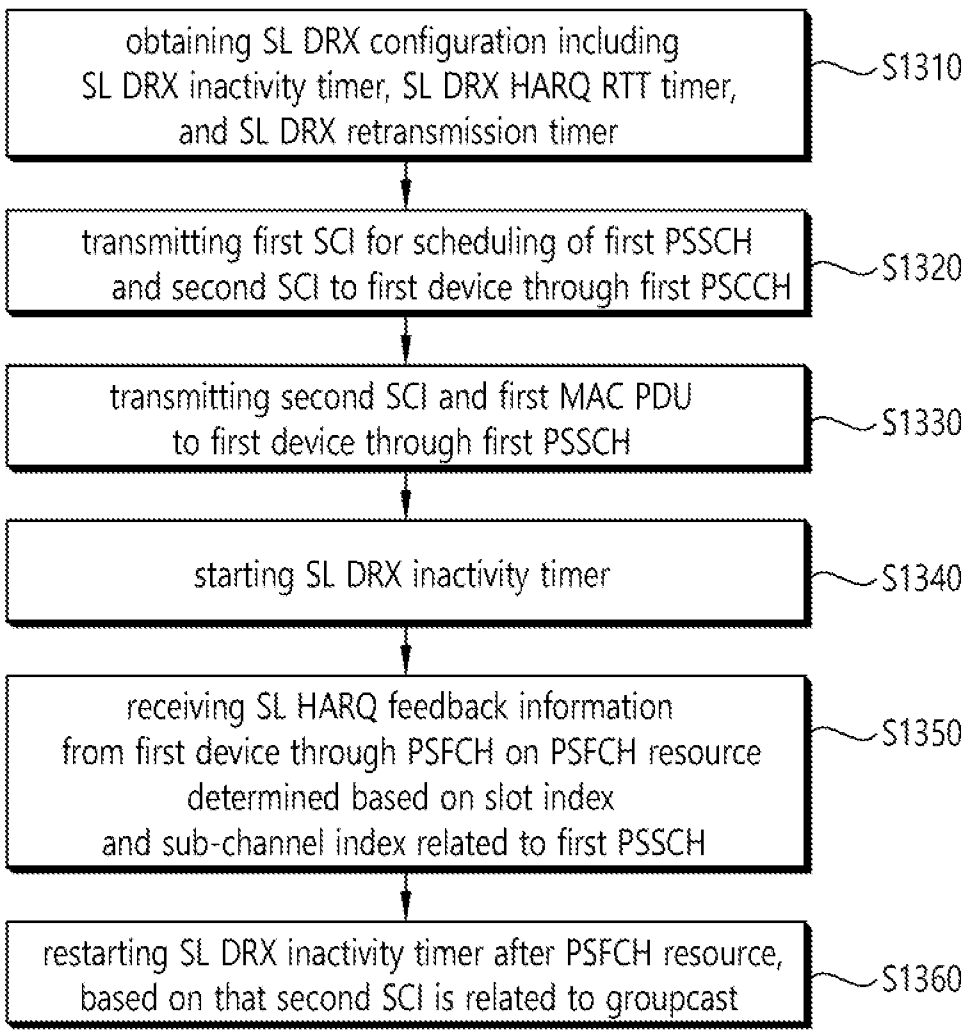
FIG. 13 shows a method for a second device to perform wireless communication according to an embodiment of the present disclosure.

FIG. 13 shows a method by which a second device performs wireless communication, according to an embodiment of the present disclosure. The embodiment of FIG. 13 may be combined with various embodiments of the present disclosure.

Referring to FIG. 13, in step S1310, the second device may obtain an SL DRX configuration including an SL DRX inactivity timer, an SL DRX HARQ RTT timer, and an SL DRX retransmission timer. In step S1320, for example, the second device may transmit first SCI for scheduling of a first PSSCH and second SCI to a first device through a first PSCCH. In step S1330, for example, the second device may transmit the second SCI and a first MAC PDU from the first device through the first PSSCH. In step S1340, the second device may start the SL DRX inactivity timer. In step S1350, for example, the second device may receive SL HARQ feedback information from the first device through a PSFCH on a PSFCH resource determined based on a slot index and a sub-channel index related to the first PSSCH. In step S1360, for example, the second device may restart the SL DRX inactivity timer after the PSFCH resource, based on that the second SCI is related to groupcast.

Additionally or alternatively, the SL DRX inactivity timer may be restarted after the PSFCH resource, based on that the second SCI is related to the groupcast and the SL DRX inactivity timer is running.

Additionally or alternatively, the SL DRX inactivity timer may be restarted after the PSFCH resource, based on that the second SCI is related to the groupcast and the SL HARQ feedback information is received from the first device.

Additionally or alternatively, the second SCI may include information representing whether an SL HARQ feedback is enabled.

Additionally or alternatively, the information representing whether the SL HARQ feedback is enabled may be set to HARQ feedback enabled.

Additionally or alternatively, the SL HARQ feedback information may be any one of negative acknowledge (NACK) information and positive acknowledge (ACK).

Additionally or alternatively, the method may further include stopping the started SL DRX inactivity timer.

Additionally or alternatively, the SL DRX inactivity timer may be restarted after the PSFCH resource, based on that the second SCI is related to the groupcast and the SL DRX inactivity timer stops.

Additionally or alternatively, at least one of the SL DRX RTT timer and the SL DRX retransmission timer may not be started, based on the restarting of the SL DRX inactivity timer.

Additionally or alternatively, the starting of at least one of the SL DRX HARQ RTT timer and the SL DRX retransmission timer may be skipped, based on the restarting of the SL DRX inactivity timer.

Additionally or alternatively, a length of the SL DRX HARQ RTT timer may be 0).

Additionally or alternatively, the SL DRX inactivity timer may be started after the PSFCH resource, based on that the second SCI is related to the groupcast and the second SCI and the MAC PDU are transmitted to the first device through the PSSCH.

Additionally or alternatively, the second SCI may include cast type information representing a NACK-ACK groupcast cast type.

Additionally or alternatively, the SL DRX inactivity timer may be restarted after the PSFCH resource, based on that the second SCI is related to the groupcast and based on the SL HARQ feedback information to be received last among a plurality of pieces of SL HARQ feedback information to be received from the first device.

Additionally or alternatively, the SL DRX inactivity timer may be restarted after the PSFCH resource, based on that the second SCI is related to the groupcast and based on the SL HARQ feedback information to be received last among a plurality of pieces of SL HARQ feedback information to be received from the first device within a running time of the SK DRX inactivity timer.

Additionally or alternatively, the first device may be at least one device included in a first group which performs groupcast communication with respect to the second device.

Additionally or alternatively, third SCI for scheduling of a second PSSCH and fourth SCI may be transmitted to the first device through a second PSSCH, within a time during which the restarted SL DRX inactivity timer is running and a time during which the SL DRX inactivity timer of a third device is running.

Additionally or alternatively, the fourth SCI and a second MAC PDU may be transmitted to the first device through the second PSSCH, within the time during which the restarted SL DRX inactivity timer is running and the time during which the SL DRX inactivity timer of the third device is running.

The proposed method may be applied to an apparatus according to various embodiments of the present disclosure. First, the processor 202 of the second device 200 may obtain an SL DRX configuration including an SL DRX inactivity timer, an SL DRX HARQ RTT timer, and an SL DRX retransmission timer. For example, the processor 202 of the second device 200 may control the transceiver 206 to transmit first SCI for scheduling of a first PSSCH and second SCI to a first device through a first PSCCH. For example, the processor 202 of the second device 200 may control the transceiver 206 to transmit the second SCI and a first MAC PDU to the first device through the first PSSCH. For example, the processor 202 of the second device 200 may start the SL DRX inactivity timer. For example, the processor 202 of the second device 200 may control the transceiver 206 to receive SL HARQ feedback information from the first device through a PSFCH on a PSFCH resource determined based on a slot index and a sub-channel index related to the first PSSCH. For example, the processor 202 of the second device 200 may restart the SL DRX inactivity timer after the PSFCH resource, based on that the second SCI is related to groupcast.

According to an embodiment of the present disclosure, a second device performing wireless communication may be provided. The second device may include: one or more memories storing instructions: one or more transceivers; and one or more processors coupling the one or more memories and the one or more transceivers. The one or more processors may execute the instructions to obtain an SL DRX configuration including an SL DRX inactivity timer, an SL DRX HARQ RTT timer, and an SL DRX retransmission timer. For example, the one or more processors may transmit first SCI for scheduling of a first PSSCH and second SCI to a first device through a first PSCCH. For example, the one or more processors may execute the instructions to transmit the second SCI and a first MAC PDU to the first device through the first PSSCH. For example, the one or more processors may execute the instructions to start the SL DRX inactivity timer. For example, the one or more processors may execute the instructions to receive SL HARQ feedback information from the first device through a PSFCH on a PSFCH resource determined based on a slot index and a sub-channel index related to the first PSSCH. For example, the one or more processors may execute the instructions to restart the SL DRX inactivity timer after the PSFCH resource, based on that the second SCI is related to groupcast.

According to an embodiment of the present disclosure, an apparatus configured to control a second UE may be provided. The apparatus may include: one or more processors; and at least one memory operatively coupled to the one or more processors and storing instructions. The one or more processors may execute the instructions to obtain an SL DRX configuration including an SL DRX inactivity timer, an SL DRX HARQ RTT timer, and an SL DRX retransmission timer. For example, the one or more processors may execute the instructions to transmit first SCI for scheduling of a first PSSCH and second SCI to a first UE through a first PSCCH. For example, the one or more processors may execute the instructions to transmit the second SCI and a first MAC PDU to the first UE through the first PSSCH. For example, the one or more processors may execute the instructions to start the SL DRX inactivity timer. For example, the one or more processors may execute the instructions to receive SL HARQ feedback information to the first UE through a PSFCH on a PSFCH resource determined based on a slot index and a sub-channel index related to the first PSSCH. For example, the one or more processors may execute the instructions to restart the SL DRX inactivity timer after the PSFCH resource, based on that the second SCI is related to groupcast.

According to an embodiment of the present disclosure, a non-transitory computer-readable medium having instructions recorded thereon may be provided. The instructions, when executed by one or more processors, may cause the one or more processors to allow a second device to obtain an SL DRX configuration including an SL DRX inactivity timer, an SL DRX HARQ RTT timer, and an SL DRX retransmission timer. For example, the instructions, when executed by one or more processors, may cause the one or more processors to allow the second device to transmit first SCI for scheduling of a first PSSCH and second SCI to a first device through a first PSCCH. For example, the instructions, when executed by one or more processors, may cause the one or more processors to allow the second device to transmit the second SCI and a first MAC PDU to the first device through the first PSSCH. For example, the instructions, when executed by one or more processors, may cause the one or more processors to allow the second device to start the SL DRX inactivity timer. For example, the instructions, when executed by one or more processors, may cause the one or more processors to allow the second device to receive SL HARQ feedback information from the first device through a PSFCH on a PSFCH resource determined based on a slot index and a sub-channel index related to the first PSSCH. For example, the instructions, when executed by one or more processors, may cause the one or more processors to allow the second device to restart the SL DRX inactivity timer after the PSFCH resource, based on that the second SCI is related to groupcast.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
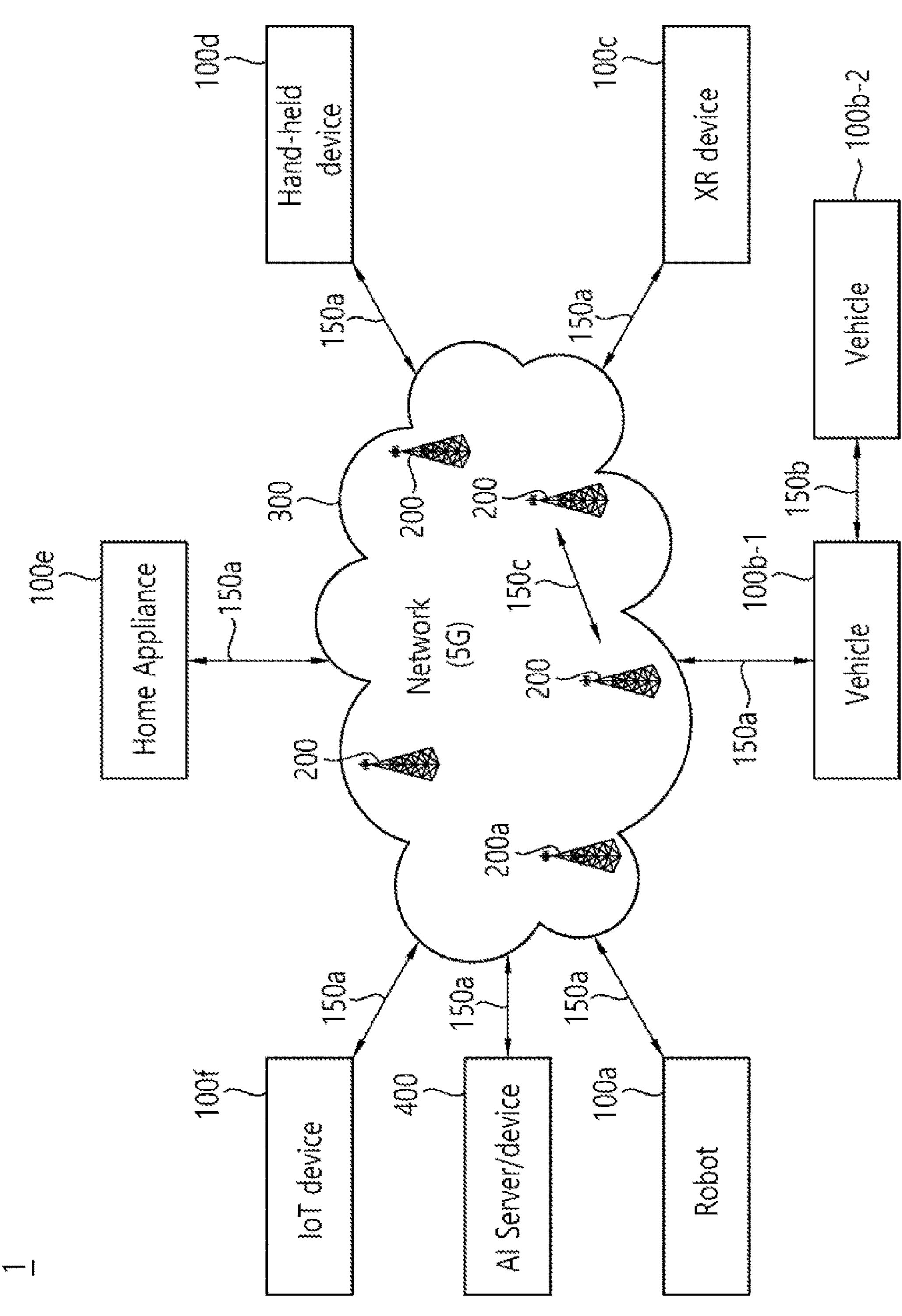
FIG. 14 shows a communication system 1, based on an embodiment of the present disclosure.

FIG. 14 shows a communication system 1, based on an embodiment of the present disclosure. The embodiment of FIG. 14 may be combined with various embodiments of the present disclosure.

Referring to FIG. 14, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrow band Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0). 2) LTE Cat M1, 3) LTE Cat M2, 4) LTE non-Bandwidth Limited (non-BL). 5) LTE-MTC. 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth. Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*. 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay. Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
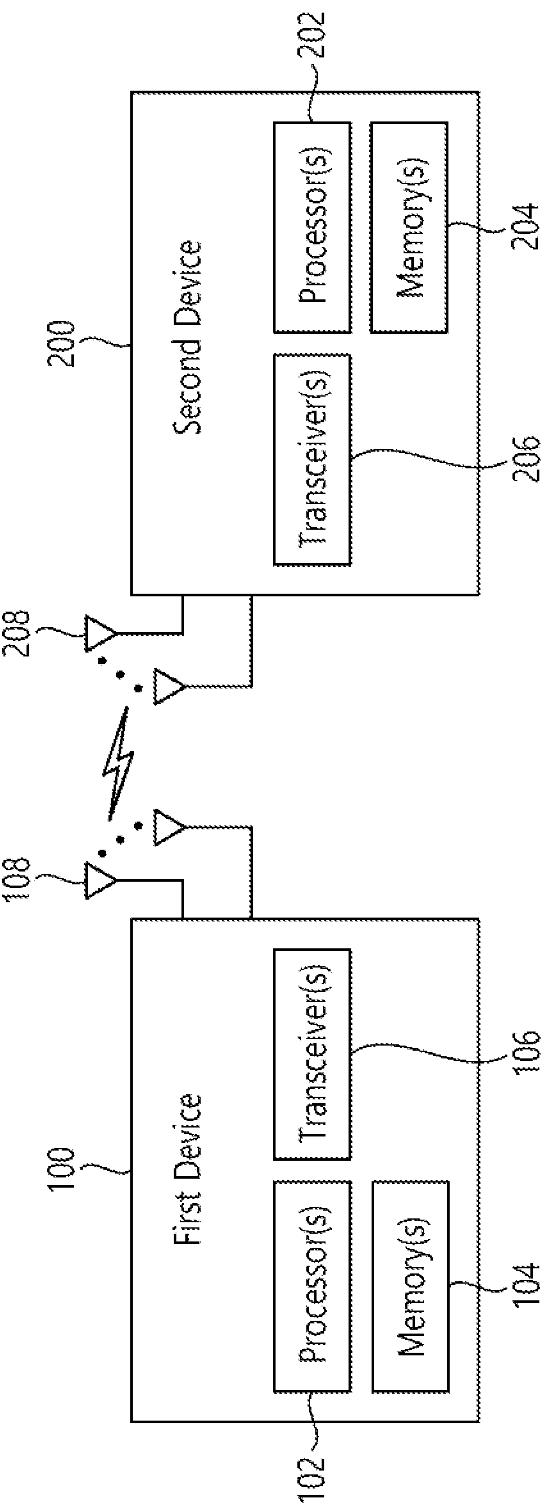
FIG. 15 shows wireless devices, based on an embodiment of the present disclosure.

FIG. 15 shows wireless devices, based on an embodiment of the present disclosure. The embodiment of FIG. 15 may be combined with various embodiments of the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory (s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document.

Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC. RLC. PDCP. RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs. SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document. The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
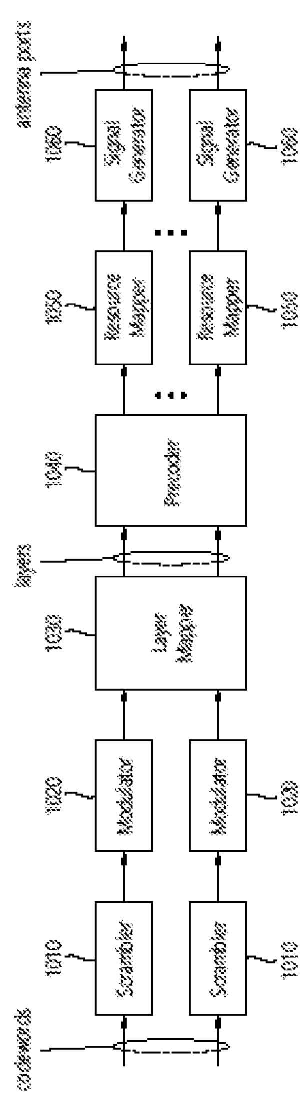
FIG. 16 shows a signal process circuit for a transmission signal, based on an embodiment of the present disclosure.

FIG. 16 shows a signal process circuit for a transmission signal, based on an embodiment of the present disclosure. The embodiment of FIG. 16 may be combined with various embodiments of the present disclosure.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein. N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules. Cyclic Prefix (CP) inserters. Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters. Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 17:
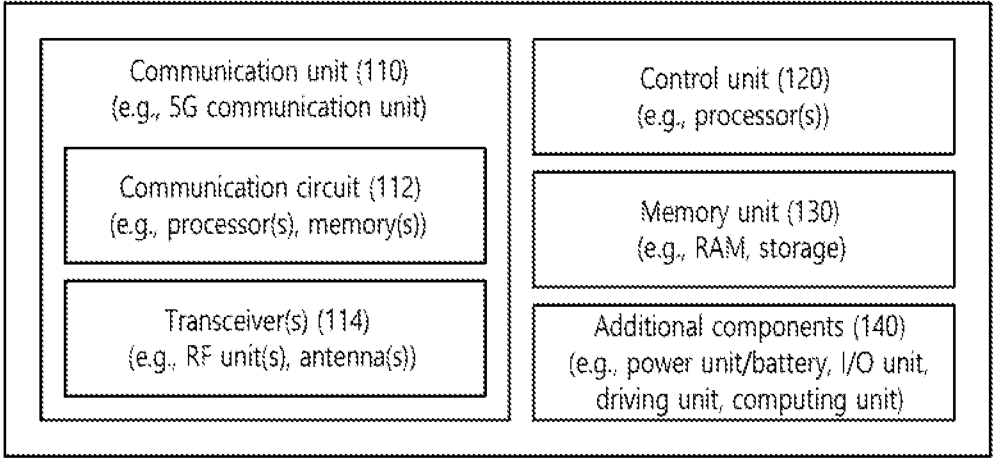
FIG. 17 shows another example of a wireless device, based on an embodiment of the present disclosure.

FIG. 17 shows another example of a wireless device, based on an embodiment of the present disclosure. The wireless device may be implemented in various forms according to a use-case/service (refer to FIG. 14). The embodiment of FIG. 17 may be combined with various embodiments of the present disclosure.

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120) may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery: input/output (I/O) unit, a driving unit, and a computing unit. The wireless device may be implemented in the form of, without being limited to, the robot (100*a* of FIG. 14), the vehicles (100*b*-1 and 100*b*-2 of FIG.

14), the XR device (100*c* of FIG. 14), the hand-held device (100*d* of FIG. 14), the home appliance (100*e* of FIG. 14), the IoT device (100*f* of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Figure 18:
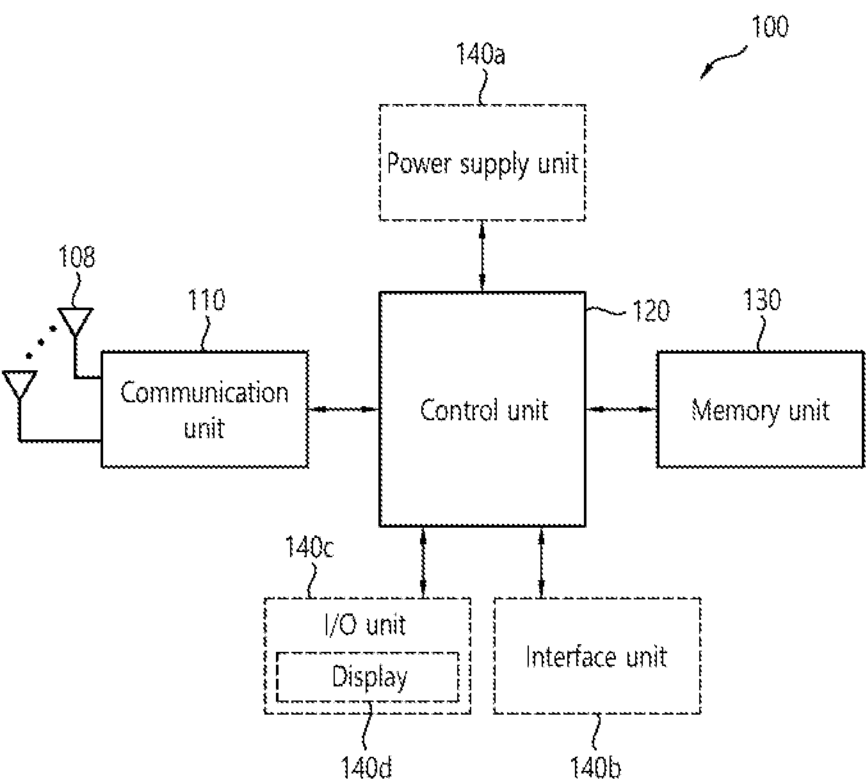
FIG. 18 shows a hand-held device, based on an embodiment of the present disclosure.

FIG. 18 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 18 may be combined with various embodiments of the present disclosure.

Referring to FIG. 18, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 19 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 19 may be combined with various embodiments of the present disclosure.

Referring to FIG. 19, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

obtaining, by a first device, an inter-user equipment (inter-UE) link discontinuous reception (DRX) configuration including an inter-UE DRX inactivity timer, an inter-UE DRX hybrid automatic repeat request (HARQ) round-trip time (RTT) timer, and an inter-UE DRX retransmission timer;

receiving, by the first device, first inter-UE control information for scheduling of a first inter-UE physical shared channel and second inter-UE control information from a second device through a first inter-UE physical control channel;

receiving, by the first device, the second inter-UE control information and a first medium access control (MAC) protocol data unit (PDU) from the second device through the first inter-UE physical shared channel;

starting, by the first device, the inter-UE DRX inactivity timer;

transmitting, by the first device, inter-UE HARQ feedback information to the second device through an inter-UE physical feedback channel on an inter-UE physical feedback channel resource determined based on a slot index and a sub-channel index related to the first inter-UE physical shared channel; and based on that the second inter-UE control information is related to groupcast, restarting, by the first device, the inter-UE DRX inactivity timer after the inter-UE physical feedback channel resource.

2. The method of claim 1, wherein, based on that the second inter-UE control information is related to the groupcast and the inter-UE DRX inactivity timer is running, the inter-UE DRX inactivity timer is restarted after the inter-UE physical feedback channel resource.

3. The method of claim 1, wherein, based on that the second inter-UE control information is related to the groupcast and the inter-UE HARQ feedback information is transmitted to the second device, the inter-UE DRX inactivity timer is restarted after the inter-UE physical feedback channel resource.

4. The method of claim 1, wherein the second inter-UE control information includes information representing whether an inter-UE HARQ feedback is enabled, wherein the information representing whether the inter-UE HARQ feedback is enabled is set to HARQ feedback enabled, and wherein the inter-UE HARQ feedback information is any one of negative acknowledge (NACK) information and positive acknowledge (ACK).

5. The method of claim 1, further comprising stopping, by the first device, the started inter-UE DRX inactivity timer, wherein, based on that the second inter-UE control information is related to the groupcast and the inter-UE DRX inactivity timer stops, the inter-UE DRX inactivity timer is restarted after the inter-UE physical feedback channel resource.

6. The method of claim 1, wherein, based on the restarting of the inter-UE DRX inactivity timer, at least one of the inter-UE DRX RTT timer or the inter-UE DRX retransmission timer is not started.

7. The method of claim 1, wherein, based on the restarting of the inter-UE DRX inactivity timer, the starting of at least one of the inter-UE DRX HARQ RTT timer or the inter-UE DRX retransmission timer is skipped.

8. The method of claim 1, wherein a length of the inter-UE DRX HARQ RTT timer is 0.

9. The method of claim 1, wherein, based on that the second inter-UE control information is related to the groupcast and the second inter-UE control information and the MAC PDU are received from the second device through the first inter-UE physical shared channel, the inter-UE DRX inactivity timer is started after the inter-UE physical feedback channel resource.

10. The method of claim 1, wherein the second inter-UE control information includes cast type information representing a NACK-ACK groupcast cast type.

11. The method of claim 1, wherein the inter-UE DRX inactivity timer is restarted after the inter-UE physical feedback channel resource, based on that the second inter-UE control information is related to the groupcast and based on the inter-UE HARQ feedback information to be transmitted last among a plurality of pieces of inter-UE HARQ feedback information to be transmitted to the second device.

12. The method of claim 11, wherein the inter-UE DRX inactivity timer is restarted after the inter-UE physical feedback channel resource, based on that the second inter-UE control information is related to the groupcast and based on the inter-UE HARQ feedback information to be transmitted last among a plurality of pieces of inter-UE HARQ feedback information to be transmitted to the second device within a running time of the inter-UE DRX inactivity timer.

13. The method of claim 12, wherein the first device is at least one device included in a first group which performs groupcast communication with respect to the second device, the method further comprising:

receiving, by the first device, third inter-UE control information for scheduling of a second inter-UE physical shared channel and fourth inter-UE control information from the second device through a second inter-UE physical shared channel, within a time during which the restarted inter-UE DRX inactivity timer is running and a time during which the inter-UE DRX inactivity timer of a third device is running; and receiving, by the first device, the fourth inter-UE control information and a second MAC PDU from the second device through the second inter-UE physical shared channel, within the time during which the restarted inter-UE DRX inactivity timer is running and the time during which the inter-UE DRX inactivity timer of the third device is running.

14. A processing device comprising:

at least one processor, and at least one memory connected to the at least one processor and storing instructions that, based on being executed by the at least one processor, cause a first device to perform operations comprising:

obtaining an inter-user equipment (inter-UE) link discontinuous reception (DRX) configuration including an inter-UE DRX inactivity timer, an inter-UE DRX hybrid automatic repeat request (HARQ) round-trip time (RTT) timer, and an inter-UE DRX retransmission timer;

receiving first inter-UE control information for scheduling of a first inter-UE physical shared channel and second inter-UE control information from a second device through a first inter-UE physical control channel;

receiving the second inter-UE control information and a first medium access control (MAC) protocol data unit (PDU) from the second device through the first inter-UE physical shared channel;

starting the inter-UE DRX inactivity timer;

transmitting inter-UE HARQ feedback information to the second device through an inter-UE physical feedback channel on an inter-UE physical feedback channel resource determined based on a slot index and a sub-channel index related to the first inter-UE physical shared channel; and based on that the second inter-UE control information is related to groupcast, restarting the inter-UE DRX inactivity timer after the SCI is related to groupcast inter-UE physical feedback channel resource.

15. The processing device of claim 14, wherein, based on that the second inter-UE control information is related to the groupcast and the inter-UE DRX inactivity timer is running, the inter-UE DRX inactivity timer is restarted after the inter-UE physical feedback channel resource.

16. The processing device of claim 15, wherein, based on that the inter-UE control information is related to the groupcast and the inter-UE HARQ feedback information is transmitted to the second device, the inter-UE DRX inactivity timer is restarted after the inter-UE physical feedback channel resource.

17. The processing device of claim 16, wherein the second inter-UE control information includes information representing whether an inter-UE HARQ feedback is enabled, wherein the information representing whether the inter-UE HARQ feedback is enabled is set to HARQ feedback enabled, and wherein the inter-UE HARQ feedback information is any one of negative acknowledge (NACK) information and positive acknowledge (ACK).

18. A method comprising:

obtaining, by a second device, an inter-user equipment (inter-UE) link discontinuous reception (DRX) configuration including an inter-UE DRX inactivity timer, an inter-UE DRX hybrid automatic repeat request (HARQ) round-trip time (RTT) timer, and an inter-UE DRX retransmission timer;

transmitting, by the second device, first inter-UE control information for scheduling of a first inter-UE physical shared channel and second inter-UE control information to a first device through a first inter-UE physical control channel;

transmitting, by the second device, the second inter-UE control information and a first medium access control (MAC) protocol data unit (PDU) to the first device through the first inter-UE physical shared channel;

starting, by the second device, the inter-UE DRX inactivity timer;

receiving, by the second device, inter-UE HARQ feedback information from the first device through an inter-UE physical feedback channel on an inter-UE physical feedback channel resource determined based on a slot index and a sub-channel index related to the first inter-UE physical shared channel; and based on that the second inter-UE control information is related to groupcast, restarting, by the second device, the inter-UE DRX inactivity timer after the inter-UE physical feedback channel resource.

19. The method of claim 18, wherein, based on that the second inter-UE control information is related to the groupcast and the inter-UE HARQ feedback information is received from the first device, the inter-UE DRX inactivity timer is restarted after the inter-UE physical feedback channel resource.

20. The method of claim 18, wherein, based on that the second inter-UE control information is related to the groupcast and based on the inter-UE HARQ feedback information to be received last among a plurality of pieces of inter-UE HARQ feedback information to be received from the first device, the inter-UE DRX inactivity timer is restarted after the inter-UE physical feedback channel resource.

* * * * *